United States Patent
Matsuo et al.

(10) Patent No.: US 9,777,092 B2
(45) Date of Patent: Oct. 3, 2017

(54) IONOMER RESIN COMPOSITION, OPTICAL FILM, POLARIZING PLATE, AND LIQUID CRYSTAL DISPLAY APPARATUS

(71) Applicant: JX NIPPON OIL & ENERGY CORPORATION, Tokyo (JP)

(72) Inventors: Akira Matsuo, Tokyo-to (JP); Sayako Uchizawa, Tokyo-to (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/900,284

(22) PCT Filed: May 25, 2015

(86) PCT No.: PCT/JP2015/064874
§ 371 (c)(1),
(2) Date: Dec. 21, 2015

(87) PCT Pub. No.: WO2015/190272
PCT Pub. Date: Dec. 17, 2015

(65) Prior Publication Data
US 2016/0369023 A1 Dec. 22, 2016

(30) Foreign Application Priority Data
Jun. 9, 2014 (JP) ................. 2014-119026

(51) Int. Cl.
| | |
|---|---|
| *C08F 220/08* | (2006.01) |
| *C08F 220/14* | (2006.01) |
| *C08F 220/12* | (2006.01) |
| *C08J 5/18* | (2006.01) |
| *C08F 8/42* | (2006.01) |
| *G02F 1/1335* | (2006.01) |
| *G02B 5/30* | (2006.01) |

(52) U.S. Cl.
CPC .............. *C08F 220/14* (2013.01); *C08F 8/42* (2013.01); *C08F 220/12* (2013.01); *C08J 5/18* (2013.01); *G02B 5/30* (2013.01); *G02B 5/3033* (2013.01); *G02F 1/1335* (2013.01); *C08J 2333/12* (2013.01)

(58) Field of Classification Search
CPC .. C08F 8/42; C08F 8/44; C08F 220/08; C08F 220/06; C08F 220/12; C08F 220/52; C08F 222/06; C08F 222/04; C08F 222/40
See application file for complete search history.

(56) References Cited

U.S. PATENT DOCUMENTS

| | | | |
|---|---|---|---|
| 4,740,561 A | * | 4/1988 | Tsujimoto ................. C08F 8/32 525/327.6 |
| 5,049,613 A | * | 9/1991 | Shimizu ................. C08L 77/00 525/179 |
| 5,162,087 A | | 11/1992 | Fukuzawa et al. |
| 5,252,667 A | * | 10/1993 | Parker ..................... C08L 27/06 524/500 |
| 5,430,115 A | * | 7/1995 | Toyooka ............... C08F 222/40 526/262 |

FOREIGN PATENT DOCUMENTS

| | | |
|---|---|---|
| JP | 4-115407 | 4/1992 |
| JP | 5-195203 | 8/1993 |
| JP | 6-25359 | 2/1994 |
| JP | 2005-232412 | 9/2005 |
| JP | 2006-45369 | 2/2006 |
| JP | 2006-233112 | 9/2006 |
| JP | 2006-299144 | 11/2006 |
| JP | 2011-242754 | 12/2011 |
| WO | 2009/123138 | 10/2009 |

OTHER PUBLICATIONS

Computer Translation of JP 2006/299144 (2006).*
International Search Report issued Jul. 21, 2015 in International (PCT) Application No. PCT/JP2015/064874.
International Preliminary Report on Patentability issued Dec. 15, 2016 in corresponding International (PCT) Application No. PCT/JP2015/064874.

* cited by examiner

*Primary Examiner* — Robert C Boyle
(74) *Attorney, Agent, or Firm* — Wenderoth, Lind & Ponack, L.L.P.

(57) ABSTRACT

[Objects] Provided is an ionomer resin composition that, when molded into a film shape, is small in both of orientational birefringence and photoelastic birefringence and excellent in transparency, heat resistance, flexibility, and size stability. Additionally, provided are an optical film including the ionomer resin composition, a polarizing plate including the optical film, and a liquid crystal display apparatus including the same.

[Solution] An ionomer resin composition according to the present invention is an ionomer resin composition obtained by reacting an acrylic thermoplastic resin (X) including a chain alkyl (meth)acrylate unit (a), an N-substituted maleimide unit (b), and an unsaturated acid and/or unsaturated acid anhydride unit (c) with a metal compound (Y), in which the acrylic thermoplastic resin (X) includes the chain alkyl (meth)acrylate unit (a), the N-substituted maleimide unit (b), and the unsaturated acid and/or unsaturated acid anhydride unit (c) in a total amount of 80% by mass or more, and contents of the structural units (a), (b), and (c) with respect to 100 parts by mass in total of the acrylic thermoplastic resin (X) except for the unsaturated acid and/or unsaturated acid anhydride unit (c) are from 65 to 87 parts by mass, from 1 to 30 parts by mass, and from 0.1 to 5 parts by mass, respectively.

18 Claims, No Drawings

IONOMER RESIN COMPOSITION, OPTICAL FILM, POLARIZING PLATE, AND LIQUID CRYSTAL DISPLAY APPARATUS

BACKGROUND OF THE INVENTION

Field of the Invention

The present invention relates to an ionomer resin composition, an optical film, a polarizing plate, and a liquid crystal display apparatus.

Background Art

Ionomer resins refer to resins having a special structure in which acidic group-containing polymer molecules are bonded to each other by a metallic ion such as sodium or zinc, such as ethylene-methacrylic acid copolymers and ethylene-acrylic acid copolymers. In addition, since ionomer resins are excellent in heat sealability, transparency, toughness, abrasion resistance, low-temperature resistance, and the like, they are used for a wide variety of applications, such as golf ball covers, ski shoes, packaging materials of food and the like, molded products, films, molding for cars, and top lifts for ladies' shoes.

Film-shaped optical members (such as, for example, a film used in a liquid crystal display apparatus and a substrate of a prism sheet) used in various kinds of optics-related instruments are generally referred to as "optical films". Optical films are required to have not only transparency but also optical characteristics strictly adjusted so as to be adaptable to optical design of image display apparatuses). One of important optical characteristics of such optical films is birefringence. In other words, it is sometimes not preferable that optical films have high birefringence. Particularly, in IPS-mode liquid crystal display apparatuses, the use of a film having high birefringence can cause negative influence on image quality. Accordingly, an optical film having low birefringence is desirably used as a protecting film or the like for a polarizing plate used in liquid crystal apparatuses.

In addition, since large screen image display apparatuses that have been recently increasingly developed use a light source with high brightness, an amount of heat generation thereof is on the increase. In order to dispose an optical film near such a light generation unit, the optical film needs to have high heat resistance. A film having high heat resistance can be achieved by using a resin having high glass transition temperature (Tg). However, such a film is fragile and easily broken. In other words, optical films are required to have high heat resistance and flexibility.

Japanese Unexamined Patent Application Publication No. 2011-242754 discloses an optical film including a (meth) acrylic polymer having an N-substituted maleimide unit and a (meth)acrylate ester unit as structural units.

Japanese Unexamined Patent Application Publication No. H6-25359 discloses a low birefringent material (such as a film, a sheet material, a lens, or an optical disc) including from 50 to 92 parts by mass of a methyl methacrylate unit, from 5 to 20 parts by mass of a specific benzyl methacrylate, from 3 to 20 parts by mass of a specific maleimide-based monomer, and from 0 to 10 parts by mass of another polymerizable vinyl monomer unit.

International Publication WO 2009/123138 discloses an ionomer resin composition that is obtained by reacting 10% by mole or more of a cyclic olefin-derived structural unit and a functional group-containing olefin copolymer having a group derived from an acid and/or a derivative thereof as a functional group with a metal compound.

CITATION LIST

Patent Literature 1: Japanese Unexamined Patent Application Publication No. 2011-242754

Patent Literature 2: Japanese Unexamined Patent Application Publication No. H6-25359

Patent Literature 3: International Publication WO 2009/123138

SUMMARY OF THE INVENTION

Technical Problems

Meanwhile, birefringence of an optical film is classified into orientational birefringence whose main factor is an orientation of a main chain of a polymer forming the optical film and photoelastic birefringence whose main factor is due to stress applied to the film.

Orientational birefringence is generally a birefringence that is caused by orientation of a main chain of a chain polymer. The orientation of the main chain occurs in a process involving flow of a material, such as, for example, extrusion molding or stretching in manufacturing a film, and remains by being fixed to the film.

On the other hand, photoelastic birefringence is a birefringence that is caused by elastic deformation of a film. For example, due to volumetric shrinkage that occurs when a film is cooled down from a temperature close to a glass transmission temperature of a polymer to a temperature equal to or less than that, elastic stress remains in the film and causes photoelastic birefringence. In addition, stress also occurs on an optical film due to an external force applied to the optical film at normal temperature in a state where the film is fixed to an apparatus, thereby causing photoelastic birefringence to occur.

An optical film to be applied to a polarizing plate, particularly to an IPS polarizing plate is desired to have favorable transparency, heat resistance, flexibility, and size stability, as well as to be sufficiently small in both of the operational birefringence and photoelastic birefringence.

Although Japanese Unexamined Patent Application Publication No. 2011-242754 discloses the optical film having small phase difference, i.e., small orientational birefringence, it does not describe photoelastic birefringence, and the optical film is insufficient in flexibility and size stability. Japanese Unexamined Patent Application Publication No. H6-25359 discloses the optical film small in orientational birefringence, but does not describe photoelastic birefringence, and the optical film is insufficient in flexibility and size stability. International Publication WO 2009/123138 discloses the film that is obtained from an ionomer resin composition excellent in both of optical characteristics and moisture permeability, but does not describe orientational birefringence and photoelastic birefringence. Accordingly, the techniques of these publications do not achieve an optical film favorable in all of transparency, heat resistance, flexibility, size stability, orientational birefringence, and photoelastic birefringence.

It is an object of the present invention to provide an ionomer resin composition small in both orientational birefringence and photoelastic birefringence and excellent in transparency, heat resistance, flexibility, and size stability when molded into a film. In addition, it is another object of the invention to provide an optical film including the ionomer resin composition, a polarizing plate, and a liquid crystal display apparatus that are provided with the optical film.

Solution to the Problems

An ionomer resin composition according to the present invention is an ionomer resin composition obtained by reacting an acrylic thermoplastic resin (X) including a chain alkyl (meth)acrylate unit (a), an N-substituted maleimide unit (b), and an unsaturated acid and/or unsaturated acid anhydride unit (c) with a metal compound (Y), in which the acrylic thermoplastic resin (X) includes the chain alkyl (meth)acrylate unit (a), the N-substituted maleimide unit (b), and the unsaturated acid and/or unsaturated acid anhydride unit (c) in a total amount of 80% by mass or more, and contents of the chain alkyl (meth)acrylate unit (a), the N-substituted maleimide unit (b), and the unsaturated acid and/or unsaturated acid anhydride unit (c) with respect to 100 parts by mass in total of the acrylic thermoplastic resin (X) except for the unsaturated acid and/or unsaturated acid anhydride unit (c) are from 65 to 87 parts by mass, from 1 to 30 parts by mass, and from 0.1 to 5 parts by mass, respectively.

With such an ionomer resin composition, there can be obtained a film small in both of orientational birefringence and photoelastic birefringence and excellent in characteristics such as transparency, heat resistance, and flexibility. Such a film can be suitably used as an optical film for use in optics-related instruments such as a liquid crystal apparatus, particularly as a polarizing plate protecting film.

In the present invention, preferably, the alkyl group of the chain alkyl (meth)acrylate unit (a) has from 1 to 6 carbon atoms.

In the present invention, preferably, the N-substituted maleimide unit (b) includes an N-aromatic group-substituted maleimide unit and/or N-alkyl group-substituted maleimide unit.

In the present invention, preferably, the N-substituted maleimide unit (b) includes an N-phenyl maleimide unit and/or N-cyclohexyl maleimide unit.

In the present invention, preferably, the unsaturated acid and/or unsaturated acid anhydride unit (c) is selected from the group consisting of (meth)acrylate units and maleic anhydride units.

In the present invention, preferably, the acrylic thermoplastic resin (X) may further include a structural unit (d) obtained from a monomer represented by the following formula (1):

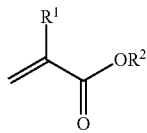

(1)

in the formula, $R^1$ represents a hydrogen atom or a methyl atom, and $R^2$ represents a group having a cyclic structure.

In the present invention, preferably, $R^2$ in the formula (1) is a group having an alicyclic structure or a group having an aromatic ring.

In one embodiment of the present invention, the ionomer resin composition can be obtained by reacting 100 parts by mass of the acrylic thermoplastic resin (X) with from 0.01 to 10 parts by mass of the metal compound (Y).

In the present invention, preferably, the metal compound (Y) is at least one selected from the group consisting of organic acid metal salts, metal carbonates, and inorganic acid metal salts.

In the present invention, preferably, the metal compound (Y) is a metal stearate.

An optical film according to the present invention includes the ionomer resin composition described above. Such an optical film can be suitably used as an optical film excellent in optical characteristics, flexibility, and size stability and used in optics-related instruments such as a liquid crystal display apparatus, particularly, as a polarizing plate protecting film.

In addition, in the present invention, preferably, the optical film is a stretched film obtained by stretching an unstretched film made of a resin material including the ionomer resin composition in at least a uniaxial direction.

Additionally, preferably, in the optical film, an absolute value of an in-plane phase difference (Re) with respect to light having a wavelength of from 400 to 800 nm is 10 nm or less, and an absolute value of a thickness direction phase difference Rth with respect to the light having the wavelength of from 400 to 800 nm is 10 nm or less.

Additionally, preferably, in the optical film, an absolute value of a photoelastic coefficient C is $5.0 \times 10^{-12}$ (/Pa) or less.

Additionally, preferably, in the optical film, a number of times of folding in MIT folding endurance test, measured based on JIS P8115 is 50 times or more.

In addition, preferably, in the optical film, absolute values of size change rates in an MD direction and a TD direction after allowing the optical film to stand in an atmosphere with 100° C. for 100 hours are 1% or less.

A third aspect of the present invention relates to a polarizing plate including the optical film described above. Additionally, a fourth aspect of the invention relates to a liquid crystal display apparatus including the polarizing plate. In the optical film, the use of the ionomer resin composition can achieve small orientational birefringence and photoelastic birefringence to allow negative influence on image quality to be sufficiently reduced. Thus, the polarizing plate and the liquid crystal apparatus including such an optical film achieve favorable image quality.

Advantageous Effects of the Invention

The present invention can achieve an ionomer resin composition small in both of orientational birefringence and photoelastic birefringence and excellent in transparency, heat resistance, flexibility, and size stability. Accordingly, in an optical film using the ionomer resin composition according to the present invention, orientational birefringence and photoelastic birefringence are both small, so that negative influence on image quality can be sufficiently reduced. In addition, the optical film has excellent heat resistance and flexibility and thus can be suitably used as an optical film for use in optics-related instruments such as a liquid crystal apparatus, particularly as a polarizing plate protecting film.

DETAILED DESCRIPTION OF THE INVENTION

Hereinafter, preferable embodiments of the present invention will be described as follows.

<Ionomer Resin Composition>

An ionomer resin composition according to the present invention is a resin composition that is formed by reacting an acrylic thermoplastic resin (X) (hereinafter referred to as "structural unit X" in some cases) with a metal compound (Y) (hereinafter referred to as "structural unit Y" in some cases).

<Acrylic Thermoplastic Resin (X)>

The acrylic thermoplastic resin (X) according to the present invention includes a chain alkyl (meth)acrylate unit (a), an N-substituted maleimide unit (b), and an unsaturated acid and/or unsaturated acid anhydride unit (c) (hereinafter referred to as "structural unit a", "structural unit b", and "structural unit c", respectively, in some cases) as essential constituent elements. In the present invention, (meth)acrylate is assumed to refer to acrylic acid or methacrylic acid.

The acrylic thermoplastic resin (X) includes the structural units (a), (b), and (c) in a total amount of 80% by mass or more, preferably 90% by mass or more, and more preferably 95% by mass or more. When the total amount of the structural units (a), (b), and (c) is 80% by mass or more, there can be obtained an acrylic thermoplastic resin having high transparency and favorable heat resistance.

In addition, the acrylic thermoplastic resin (X) may further include, in addition to the structural units (a), (b), and (c), a structural unit (d) obtained from a monomer represented by the following formula (1) (hereinafter referred to as "structural unit d" in some cases):

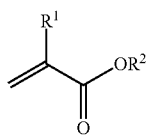

(1)

In the formula, $R^1$ represents a hydrogen atom or a methyl atom. In addition, $R^2$ represents a group having a cyclic structure, and examples of $R^2$ include a group having an alicyclic structure and a group having an aromatic ring.

<Chain Alkyl (Meth)Acrylate Unit (a)>

The chain alkyl (meth)acrylate unit (a) is a structural unit obtained from a (meth)acrylic acid alkyl monomer having a chain alkyl group.

Herein, the chain alkyl group of the chain alkyl (meth)acrylate unit (a) may be straight-chain or branched-chain.

The chain alkyl group of the structural unit (a) has preferably from 1 to 6 carbon atoms, and more preferably from 1 to 4 carbon atoms.

Examples of the chain alkyl group of the chain alkyl (meth)acrylate unit (a) include methyl groups, ethyl groups, n-propyl groups, isopropyl groups, n-butyl groups, isobutyl groups, n-hexyl groups, and 2-ethylhexyl groups. Among them, methyl groups, ethyl groups, n-propyl groups, and isopropyl groups are preferable, and methyl groups are more preferable.

Specifically, examples of the chain alkyl (meth)acrylate unit (a) include methyl (meth)acrylate units, ethyl (meth)acrylate units, n-propyl (meth)acrylate units, isopropyl (meth)acrylate units, n-butyl (meth)acrylate units, isobutyl (meth)acrylate units, n-hexyl (meth)acrylate units, and 2-ethylhexyl (meth)acrylate units. Among them, methyl (meth)acrylate units, (meth)acryl ethyl units, n-propyl (meth)acrylate units, and isopropyl (meth)acrylate units are preferable, and methyl (meth)acrylate units are more preferable. In addition, the structural unit (a) may be any one thereof or may include two or more thereof.

A content of the structural unit (a) with respect to 100 parts by mass in total of the acrylic thermoplastic resin (X) except for the unsaturated acid and/or unsaturated acid anhydride unit (c) is 65 parts by mass or more, preferably 70 parts by mass or more, and more preferably 80 parts by mass or more. Setting the content of the structural unit (a) to 65 parts by mass or more can prevent increases in the absolute value of the thickness direction phase difference Rth and the absolute value of the photoelastic coefficient C.

In addition, the content of the structural unit (a) with respect to 100 parts by mass in total of the acrylic thermoplastic resin (X) except for the unsaturated acid and/or unsaturated acid anhydride unit (c) is 87 parts by mass or less, and may be 85 parts by mass or less. Setting the content of the structural unit (a) to 87 parts by mass or less can prevent increases in the absolute value of the thickness direction phase difference Rth and the absolute value of the photoelastic coefficient C, and also can prevent reduction in the glass transition temperature (Tg) of the acrylic thermoplastic resin (X).

<N-Substituted Maleimide Unit (b)>

Examples of the N-substituted maleimide unit (b) include N-aromatic-substituted maleimide units and N-alkyl-substituted maleimide units. The acrylic thermoplastic resin (X) can include both of an N-aromatic-substituted maleimide unit and an N-alkyl-substituted maleimide unit, as the N-substituted maleimide unit (b).

The N-aromatic-substituted maleimide unit is a structural unit that is obtained from an N-aromatic-substituted maleimide monomer, and can be referred to as a structural unit in which an aromatic group is substituted on a nitrogen atom of a maleimide unit. Herein, the aromatic group may be a monocyclic aromatic group or a polycyclic aromatic group. In addition, in the present invention, examples of the aromatic group also include aromatic alkyl groups such as a benzyl group, in which an aromatic group is bonded to a nitrogen atom via a hydrocarbon group.

The aromatic group of the N-aromatic-substituted maleimide unit has preferably from 6 to 18 carbon atoms, and more preferably from 6 to 14 carbon atoms.

Examples of the aromatic group of the N-aromatic-substituted maleimide units include benzyl groups, phenyl groups, naphthyl groups, anthryl groups, and phenanthryl groups. Among them, benzyl groups and phenyl groups are preferable, and phenyl groups are more preferable.

Specifically, examples of the N-aromatic-substituted maleimide unit include N-benzyl maleimide units, N-phenyl maleimide units, N-naphthyl maleimide units, N-anthryl maleimide units, and N-phenanthryl maleimide units. Among the N-aromatic-substituted maleimide units, N-benzyl maleimide units and N-phenyl maleimide units are preferable, of which N-phenyl maleimide units are more preferable. In addition, the acrylic thermoplastic resin (X) may include one or two or more N-aromatic-substituted maleimide units.

The N-alkyl-substituted maleimide unit is a structural unit that is obtained from an N-alkyl-substituted maleimide monomer, and can be referred to as a structural unit in which an alkyl group is substituted on a nitrogen atom of a maleimide unit. Herein, the alkyl group may be a chain alkyl group or a cyclic alkyl group, and is preferably a cyclic alkyl group. In addition, the chain alkyl group represents an alkyl group that does not have a cyclic structure, and the cyclic alkyl group represents an alkyl group that has an alicyclic structure.

The alkyl group of the N-alkyl-substituted maleimide unit has preferably from 1 to 10 carbon atoms, and more preferably from 3 to 8 carbon atoms.

Examples of the alkyl group of the N-alkyl-substituted maleimide unit include methyl groups, ethyl groups, n-propyl groups, isopropyl groups, n-butyl groups, isobutyl groups, t-butyl groups, n-hexyl groups, 2-ethylhexyl groups, dodecyl groups, lauryl groups, and cyclohexyl groups. Among them, methyl groups, ethyl groups, and cyclohexyl groups are preferable, and cyclohexyl groups are more preferable.

Specifically, examples of the N-alkyl-substituted maleimide unit include N-methyl maleimide units, N-ethyl maleimide units, N-n-propyl maleimide units, N-isopropyl maleimide units, N-n-butyl maleimide units, N-isobutyl maleimide units, N-t-butyl maleimide units, N-n-hexyl maleimide units, N-2-ethylhexyl maleimide units, N-dodecyl maleimide units, N-lauryl maleimide units, and N-cyclohexyl maleimide units. Among the N-alkyl-substituted maleimide units mentioned above, N-methyl maleimide units, N-ethyl maleimide units, and N-cyclohexyl maleimide units are preferable, among which N-cyclohexyl maleimide units are more preferable. In addition, the N-alkyl-substituted maleimide unit may be one thereof or may include two or more thereof.

A content of the structural unit (b) with respect to 100 parts by mass in total of the acrylic thermoplastic resin (X) except for the unsaturated acid and/or unsaturated acid anhydride unit (c) is 1 part by mass or more, preferably 5 parts by mass or more, more preferably 10 parts by mass or more, and still more preferably 15 parts by mass, and may be 20 parts by mass or more. Setting the content of the structural unit (b) to 1 part by mass or more can prevent reduction in mechanical strength.

Additionally, the content of the structural unit (b) with respect to 100 parts by mass in total of the acrylic thermoplastic resin (X) except for the unsaturated acid and/or unsaturated acid anhydride unit (c) is 30 parts by mass or less, preferably 25 parts by mass or less, and more preferably 23 parts by mass or less. Setting the content of the structural unit (b) to 30 parts by mass or less can prevent increase in the absolute value of the photoelastic coefficient C.

<Unsaturated Acid and/or Unsaturated Acid Anhydride Unit (c)>

The unsaturated acid and/or unsaturated acid anhydride unit (c) is a structural unit that is obtained from an unsaturated acid and/or unsaturated acid anhydride, and is included as a structural unit including an acid group and/or acid anhydride group in the acrylic thermoplastic resin (X). The acrylic thermoplastic resin (X) can include both of an unsaturated acid unit and an unsaturated acid anhydride unit, as the unsaturated acid and/or unsaturated acid anhydride unit (c). The acid group and the acid anhydride group are neutralized by contact with the metal compound (Y). In addition, the acid group refers to a structural unit derived from an acid compound, and examples of the acid group include carboxy groups and sulfo groups. Additionally, the acid anhydride refers to a structural unit derived from an anhydride of an acid compound, and examples of the acid anhydride include carboxylic acid anhydride groups and sulfonic acid anhydride groups.

The unsaturated acid unit is a structural unit that includes at least one acid group, and is obtained from an unsaturated acid monomer.

The unsaturated acid monomer may have a protecting group that bonds to an acid group. The protecting group is a substituent that bonds to the acid group of the unsaturated acid monomer via an ester bond or the like and is desorbed in a heating step such as a copolymerization reaction step, a devolatilization step, or a molding step. The presence of the protecting group in the unsaturated acid monomer allows manufacturing of an acrylic thermoplastic resin that cannot be manufactured by an unsaturated acid monomer without any protecting group. For example, hydrophobic enhancement allows manufacturing of an acrylic thermoplastic resin that has an intended composition by a suspension polymerization method using water as a solvent. Examples of the protecting group include alkyl groups having from 1 to 10 carbon atoms, preferably, tertiary alkyl groups having from 1 to 10 carbon atoms, 4-nitrobenzyl groups, 4-methoxy benzyl groups, and 4-chlorobenzyl groups. Among them, tertiary alkyl groups having from 1 to 10 carbon atoms are more preferable, and tert-butyl groups are still more preferable.

Herein, the unsaturated acid monomer has at least one carbon-carbon double bond and at least one acid group, and examples thereof include carboxylic acids and sulfonic acids.

Specifically, examples of the unsaturated acid unit include (meth)acrylic acid units, maleic acid units, fumaric acid units, itaconic acid units, crotonic acid units, isocrotonic acid units, vinyl sulfonic acid units, and monomethyl maleate units. Among them, (meth)acrylic acid units are preferable, and unsaturated acid units obtained from (meth)acrylic acids having a protecting group are particularly preferable. In addition, the acrylic thermoplastic resin (X) may have one or two or more unsaturated acid units.

The unsaturated acid anhydride unit is a structural unit that includes an acid anhydride group and is obtained from an unsaturated acid anhydride monomer.

Herein, the unsaturated acid anhydride monomer has at least one carbon-carbon double bond and at least one acid anhydride group, and examples thereof include carboxylic acid anhydrides and sulfonic acid anhydrides.

Specifically, examples of the unsaturated acid anhydride unit include (meth)acrylic acid anhydride units, maleic acid anhydride units, citraconic acid anhydride units, and itaconic acid anhydride units. Among them, maleic acid anhydride units are preferable. In addition, the acrylic thermoplastic resin (X) may include one unsaturated acid anhydride unit or two or more unsaturated acid anhydride units.

A content of the structural unit (c) with respect to 100 parts by mass in total of the acrylic thermoplastic resin (X) except for the unsaturated acid and/or unsaturated acid anhydride unit (c) is 0.1 parts by mass or more, preferably 0.5 parts by mass or more, and more preferably 1 part by mass or more. Setting the content of the structural unit (c) to 0.1 parts by mass or more allows an ionomer to be formed by addition of a metal salt.

In addition, the content of the structural unit (c) with respect to 100 parts by mass in total of the acrylic thermoplastic resin (X) except for the unsaturated acid and/or unsaturated acid anhydride unit (c) is 5 parts by mass or less, preferably 3 parts by mass or less, and more preferably 2 parts by mass or less. Setting the content of the structural unit (c) to 5 parts by mass or less can prevent reductions in transparency and humidity resistance of the resin composition.

<Structural Unit (d)>

The acrylic thermoplastic resin (X) according to the present invention can include, besides the above-described three kinds of structural units, a structural unit (d) that is obtained from a monomer represented by the following formula (1), as another structural unit:

(1)

R¹ represents a hydrogen atom or a methyl group. In addition, R² represents a group having a cyclic structure, and examples of R² include a group having an alicyclic structure and a group having an aromatic ring.

The group having an alicyclic structure is preferably a group having from 6 to 18 carbon atoms, and more preferably a group having from 8 to 12 carbon atoms.

Examples of the group having an alicyclic structure include cyclopentyl groups, cyclohexyl groups, cycloheptyl groups, cyclooctyl groups, dicyclopentanyl groups, isobornyl groups, 4-tert-butyl cyclohexyl groups, dicyclopentanyl oxyethyl groups, 3, 5-dihydroxy-1-adamantyl groups, 3-hydroxy-1-adamantyl groups, 2,2,5-trimethyl cyclohexyl groups, dicyclopentenyl groups, 2-decahydro naphthyl groups, and dicyclopentenyl oxyethyl groups. Among them, alicyclic hydrocarbon groups are preferable as the group having an alicyclic structure, and more preferable are dicyclopentanyl groups, isobornyl groups, and 4-tert-butyl cyclohexyl groups.

Specifically, examples of the structural unit (d) in which R² of the formula (1) is a group having an alicyclic structure include cyclopentyl (meth)acrylate, cyclohexyl (meth)acrylate, cycloheptyl (meth)acrylate, cyclooctyl (meth)acrylate, dicyclopentanyl (meth)acrylate, isobornyl (meth)acrylate, 4-tert-butyl cyclohexyl (meth)acrylate, dicyclopentanyl oxyethyl (meth)acrylate, 3,5-dihydroxy-1-adamantyl (meth)acrylate, 3-hydroxy-1-adamantyl (meth)acrylate, 2,2,5-trimethyl cyclohexyl (meth)acrylate, dicyclopentenyl (meth)acrylate, 2-decahydro naphthyl (meth)acrylate, and dicyclopentenyl oxyethyl (meth)acrylate. Among them, dicyclopentanyl (meth)acrylate, isobornyl (meth)acrylate, and 4-tert-butyl cyclohexyl (meth)acrylate are preferable as the structural unit (d).

The group having an aromatic ring is preferably a group having from 6 to 16 carbon atoms, and more preferably a group having from 7 to 10 carbon atoms.

Examples of the group having an aromatic ring include substituted or unsubstituted benzyl groups, naphthyl groups, anthracene groups, and phenanthrene groups. Among them, benzyl groups are preferable.

Examples of the structural unit (d) in which R² of the formula (1) is a substituted or unsubstituted benzyl group include phenoxyethyl (meth)acrylate units, benzyl (meth)acrylate units, 2,4,6-tribromophenyl (meth)acrylate units, phenoxy diethylene glycol (meth)acrylate units, biphenyl (meth)acrylate units, and pentafluorobenzyl (meth)acrylate (meth)acrylate units. Among them, phenoxyethyl (meth)acrylate units, benzyl (meth)acrylate units, and 2,4,6-tribromophenyl (meth) acrylate units are preferable, and benzyl (meth)acrylate units are more preferable.

A content of the structural unit (d) with respect to 100 parts by mass in total of the acrylic thermoplastic resin (X) except for the unsaturated acid and/or unsaturated acid anhydride unit (c) is preferably from 1 to 20 parts by mass, and more preferably from 3 to 15 parts by mass. When the content of the (meth)acrylic acid aromatic unit (d) is within the above range, heat resistance and low-birefringence properties can be enhanced without impairing transparency.

The acrylic thermoplastic resin (X) according to the preset invention may include a repeating unit derived from another monomer copolymerizable with the above monomer within a range not impairing the object of the invention, as another structural unit in addition to the above-described three kinds of structural units and (d). Examples of the other monomer copolymerizable therewith include aromatic vinyls; unsaturated nitriles; olefins; dienes; vinyl ethers; vinyl esters; vinyl fluorides; and allyl esters or methacryl esters of saturated fatty acid monocarboxylic acids such as allyl propionate; poly(meth)acrylates; poly acrylate; glycidyl compounds; and unsaturated carboxylic acids. The other monomer can be one or a combination of two or more selected from the group consisting of them.

<Metal Compound (Y)>

With the use of the metal compound (Y), acid groups in the acrylic thermoplastic resin (X) are neutralized by a metallic ion ionized from the metal compound (Y), thereby forming a salt with the metallic ion. The plurality of acid groups is neutralized by the metallic ion, whereby the acrylic thermoplastic resin (X) is pseudo-crosslinked to each other to form an ionomer resin.

Examples of the metal compound (Y) include metal salts, metal oxides, and metal hydroxides, and metal salts are preferable. These may be used singularly or in combination of two or more thereof.

Examples of the metallic ion produced from the metal compound (Y) include monovalent metallic ions such as lithium ion, sodium ion, potassium ion, rubidium ion, and cesium ion, divalent metallic ions such as magnesium ion, calcium ion, iron ion, copper ion, zinc ion, lead ion, and barium ion, and trivalent metallic ions such as aluminum ion.

Examples of the metal salts include organic acid metal salts, metal carbonates, and inorganic acid metal salts.

Examples of the organic acid metal salts include metal acetate, metal palmitate, metal stearate, and metal oleate. Among them, metal acetate and metal stearate are preferable, and metal stearate is more preferable.

Specifically, examples of the organic acid metal salts include sodium acetate, calcium acetate, zinc acetate, barium acetate, sodium palmitate, calcium palmitate, zinc palmitate, barium palmitate, sodium stearate, calcium stearate, zinc stearate, barium stearate, sodium oleate, calcium oleate, zinc oleate, and barium oleate. Among them, zinc acetate, zinc stearate, and barium stearate are preferable, and zinc stearate is more preferable.

Examples of the metal carbonates include potassium carbonate, potassium hydrogen carbonate, sodium carbonate, calcium carbonate, zinc carbonate, and barium carbonate. Among them, potassium hydrogen carbonate and sodium carbonate are more preferable.

Examples of the inorganic acid metal salts include metal phosphate, metal borate, metal sulfate, and meatal sulfonate. Among them, metal phosphate and metal borate are preferable, and metal phosphate is more preferable, since an anionic portion remains in the ionomer resin composition to improve melt tension and the like.

Specifically, examples of the inorganic acid metal salts include sodium phosphate, magnesium phosphate, calcium phosphate, zinc phosphate, sodium borate, magnesium borate, calcium borate, zinc borate, sodium sulfate, magnesium sulfate, calcium sulfate, zinc sulfate, sodium sulfonate, magnesium sulfonate, calcium sulfonate, and zinc sulfonate. Among them, sodium phosphate, magnesium phosphate, and zinc phosphate are preferable, and zinc phosphate is more preferable.

Examples of the metal oxides include potassium oxide, magnesium oxide, calcium oxide, iron oxide, copper oxide, zinc oxide, and aluminum oxide.

Examples of the metal hydroxides include potassium hydroxide, magnesium hydroxide, calcium hydroxide, iron hydroxide, copper hydroxide, zinc hydroxide, and aluminum hydroxide.

An amount of usage of the metal compound (Y) with respect to an amount of usage of the acrylic thermoplastic resin (X) in manufacturing the ionomer resin composition is preferably 0.01 parts by mass or more, more preferably 0.1 parts by mass or more, still more preferably 0.3 parts by mass or more, and may be 0.5 parts by mass or more. By setting the content of the metal compound (Y) to 0.01 parts by mass or more, the acid groups in the acrylic thermoplastic resin (X) are adequately neutralized by the metal compound (Y), thus improving mechanical strength of the film.

The amount of usage of the metal compound (Y) with respect to the amount of usage of the acrylic thermoplastic resin (X) in manufacturing the ionomer resin composition is 10.0 parts by mass or less, preferably 5.0 parts by mass or less, and more preferably 3.0 parts by mass or less. When the content of the metal compound (Y) is 10.0 parts by mass or less, crosslinking density increases, thereby significantly reducing melting fluidity of the resin composition. As a result, reduction in film manufacturing efficiency and occurrence of evenness on a surface of an obtained film can be prevented.

<Physical Properties of Acrylic Thermoplastic Resin (X)>

The acrylic thermoplastic resin (X) according to the present invention has a weight average molecular weight (Mw) of preferably from $5\times10^4$ to $100\times10^4$, and more preferably from $10\times10^4$ to $20\times10^4$, from the viewpoint of flexibility when molded into a film and film manufacturing efficiency such as melt flow rate. When the acrylic thermoplastic resin (X) has a weight average molecular weight of $5\times10^4$ or more, it can have strength necessary as a polymer. In addition, when the acrylic thermoplastic resin (X) has a weight average molecular weight of $100\times10^4$ or less, it can be formed into a molded body by press molding. When the weight average molecular weight of the acrylic thermoplastic resin (X) is $20\times10^4$ or less, the melt flow rate thereof reduces and thus melt extrusion moldability improves, so that reduction in the film manufacturing efficiency can be prevented.

In the acrylic thermoplastic resin (X) according to the present invention, a molecular weight distribution (Mw/Mn) represented by a ratio of weight average molecular weight (Mw) to number average molecular weight (Mn) is preferably from 1.5 to 3.5, and more preferably from 1.7 to 3.0. Setting the molecular weight distribution (Mw/Mn) within the above range can prevent moldability from being reduced, so that reduction in the film manufacturing efficiency can be prevented.

Additionally, in the present specification, the weight average molecular weight (Mw) and the number average molecular weight (Mn) of the acrylic thermoplastic resin (X) represent values measured in terms of standard polystyrene molecular weight by HLC-8220 GPC manufactured by Tosoh Corporation. Columns used in GPC can be Super-Multipore HZ-M manufactured by Tosoh Corporation. Measurement conditions can be tetrahydrofuran (THF) for HPLC as a solvent; a flow rate of 0.35 ml/min; and a column temperature of 40° C.

The acrylic thermoplastic resin (X) has a glass transition temperature of preferably 120° C. or more. Thereby, heat resistance of the film further improves and therefore size stability thereof against heat improves, thus allowing the film to be more suitable as a polarizing plate protecting film. Additionally, an upper limit of the glass transition temperature is not particularly limited, and may be 160° C. or less, 150° C. or less, or 140° C. or less, from the viewpoint of achieving sufficient heat resistance as an optical film.

Additionally, in the present specification, the glass transition temperature represents a value obtained from an on-set temperature of a glass transition point at the time of temperature increase at a temperature increase rate of 10° C./min using a differential scanning calorimeter DSC 7020 manufactured by SII Nanotechnology Inc. In addition, the mass of specimens is from 5 to 10 mg.

The acrylic thermoplastic resin (X) has a residual volatile content of preferably 1.0% by mass or less, more preferably 0.7% by mass or less, and still more preferably 0.6% by mass or less. Thereby, coloring during molding processing and reduction in heat resistance and weather resistance of a molded body can be prevented.

Additionally, in the present specification, the residual volatile content was obtained by subtracting a mass of the acrylic thermoplastic resin (X) dried under reduced pressure for 12 hours under conditions of 120° C. and 0.1 mmHg from a mass of the acrylic thermoplastic resin (X) before drying.

<Method for Manufacturing Acrylic Thermoplastic Resin (X)>

A method for manufacturing the acrylic thermoplastic resin (X) is not particularly limited. For example, the acrylic thermoplastic resin (X) can be manufactured by any of methods such as bulk polymerization, emulsion polymerization, solution polymerization, and suspension polymerization. Among these methods, solution polymerization is suitable since it facilitates temperature control during reaction and adjustment of viscosity of the acrylic thermoplastic resin. In addition, since processing after polymerization is easy and it is unnecessary to perform a step of removing an organic solvent from a polymerization system under high temperature, there can be obtained an acrylic thermoplastic resin having higher hue and high flexing endurance, so that suspension polymerization is suitable.

Conditions for solution polymerization are not particularly limited, and known conditions for solution polymerization can be applied as appropriate. Hereinafter, an embodiment of the method for manufacturing the acrylic thermoplastic resin (X) by solution polymerization will be described.

In the present embodiment, 100 parts by mass of toluene as a reaction solvent, 80.0 parts by mass of methyl methacrylate, 20.0 parts by mass of N-phenyl maleimide, and 1.0 part by mass of acrylic acid as monomers, 0.1 parts by mass of LUPEROX P as a polymerization initiator, manufactured by ARKEMA Yoshitomi, Ltd., and 0.06 parts by mass of 1-octanethiol as a chain transfer agent were charged into a reaction vessel equipped with a stirring device, a thermosensor, a condenser tube, and a nitrogen introducing tube. The mixture was stirred well while passing nitrogen therethrough to homogenize the monomer phase and the reaction solvent. Next, the temperature of the mixture was increased up to 110° C., and after confirming reflux of toluene, a separately prepared initiator solution containing 0.4 parts by mass of LUPEROX and 4.6 parts by mass of toluene was added dropwise in 3 hours. After finishing dropping and then keeping the mixed solution for 4 hours, the obtained polymer solution was cooled down to 70° C. The polymer solution was flushed into a flush tank pre-heated to 270° C. under a reduced pressure of 50 kPa, whereby an acrylic thermoplastic resin (X) was separated and recovered from the solvent.

The kinds of and added amounts of the polymerization initiator, the chain transfer agent, and the dispersant described above are merely one example, and conditions for solution polymerization are not particularly limited thereto. In solution polymerization, the conditions therefor can be changed as appropriate within a range that can achieve a weight average molecular weight of from $5\times10^4$ to $100\times10^4$, particularly from $10 \times 10^4$ to $20 \times 10^4$. For example, the weight average molecular weight of the acrylic thermoplastic resin (X) can be adjusted as appropriate by changing the amount of addition of the chain transfer agent.

Examples of the polymerization initiator that can be used include LUPEROX P manufactured by ARKEMA Yoshitomi, Ltd. In addition, the amount of usage of the polymerization initiator may be from 0.01 to 5 parts by mass or from 0.1 to 2 parts by mass, with respect to 100 parts by mass in total of the monomers.

Examples of the chain transfer agent include thiols such as 1-octanethiol, 1-dodecanethiol, and tert-dodecanethiol. In addition, the amount of usage of the chain transfer agent can be changed as appropriate according to a desired weight average molecular weight. For example, the amount of usage thereof can be from 0.05 to 0.6 parts by mass, and may be from 0.07 to 0.5 parts by mass, with respect to 100 parts by mass in total of the monomers.

Conditions for solution polymerization can be adjusted as appropriate according to the kinds of and amounts of usage of the polymerization initiator and the chain transfer agent. For example, reaction temperature can be from 70 to 120° C., and preferably from 80 to 115° C. Additionally, reaction time is not particularly limited as long as a time for sufficient progress of reaction is secured. For example, the reaction time can be from 2 to 10 hours, and preferably from 3 to 6 hours.

Conditions for suspension polymerization are not particularly limited, and known conditions for suspension polymerization can be applied as appropriate. Hereinafter, one example of a method for manufacturing an acrylic thermoplastic resin by suspension polymerization will be described. However, the present invention is not particularly limited to the following one example.

First, 300 parts by mass of deionized water and 0.6 parts by mass of polyvinyl alcohol as a dispersant are charged into a suspension polymerization apparatus, and stirring is started. Next, 80.0 parts by mass of methyl methacrylate, 20.0 parts by mass of N-phenyl maleimide, and 1.0 part by mass of acrylic acid as monomers, 1 part by mass of PEROYL TCP as a polymerization initiator, manufactured by NOF Corporation, and 0.22 parts by mass of 1-octanethiol as a chain transfer agent are charged into the suspension polymerization apparatus.

After that, the reaction system is heated up to 70° C. while passing nitrogen through the suspension polymerization apparatus, and then, the reaction system is kept at 70° C. for 3 hours to be allowed to react. After the reaction, the reaction system is cooled down to room temperature, and operations such as filtration, washing, and drying are performed as needed, whereby an acrylic thermoplastic resin in particle form can be obtained. Such a method can easily manufacture an acrylic thermoplastic resin whose weight average molecular weight Mw is within a range of $5 \times 10^4$ or more and $100 \times 10^4$ or less.

In addition, the kinds of and added amounts of the polymerization initiator, the chain transfer agent, and the dispersant described above are merely one example, and conditions for suspension polymerization are not particularly limited thereto. In suspension polymerization, the conditions therefor can be changed as appropriate within a range that can achieve a weight average molecular weight Mw of $5 \times 10^4$ or more and $100 \times 10^4$ or less. For example, the weight average molecular weight Mw of the acrylic thermoplastic resin (X) can be adjusted as appropriate by changing the amount of addition of the chain transfer agent.

Examples of the polymerization initiator include PEROYL TCP, PEROCTA O, and NIPER BW manufactured by NOF Corporation. In addition, the amount of usage of the polymerization initiator can be, for example, 0.05 parts by mass or more and 0.6 parts by mass or less, and may be 0.07 parts by mass or more and 0.5 parts by mass or less, with respect to 100 parts by mass in total of the monomers.

Examples of the dispersant include PVA such as KURARAY POVAL manufactured by Kuraray Co., Ltd., and sodium polyacrylate. In addition, the amount of usage of the dispersant may be, for example, 0.01 parts by mass or more and 1.0 part by mass or less, or 0.02 parts by mass or more and 0.6 parts by mass or less, with respect to 100 parts by mass in total of the monomers.

Conditions for suspension polymerization can be adjusted as appropriate according to the kinds, amounts of usage, and the like of the polymerization initiator, the chain transfer agent, and the dispersant. For example, the reaction temperature can be from 50° C. or more and 90° C. or less, and preferably may be from 60° C. or more and 85° C. or less. Additionally, the reaction time is not particularly limited as long as a time for sufficient progress of reaction is secured. For example, the reaction time can be 2 hours or more and 10 hours or less, and preferably 3 hours or more and 8 hours or less. Additionally, monomer conversion rate is determined according to a life-span of a reaction active species, monomer reactivity, and the like. Thus, even if the reaction time is extended, the monomer conversion rate does not necessarily improve.

<Method for Manufacturing Ionomer Resin Composition>

The ionomer resin composition can be obtained by reacting the acrylic thermoplastic resin (X) with the metal compound (Y), and specifically, by dry-blending the acrylic thermoplastic resin (X) and the metal compound (Y) and then melt-mixing them.

Melt-mixing of the acrylic thermoplastic resin (X) and the metal compound (Y) can be performed, for example, using a twin-screw extruder KZW-30MG manufactured by Technovel Corporation, or the like.

Temperature for melt-mixing is preferably 220° C. or more and 300° C. or less, and more preferably 250° C. or more and 280° C. or less. By setting the temperature for melt mixing to 220° C. or more, the acrylic thermoplastic resin (X) and the metal compound (Y) can be sufficiently melt-mixed together, so that there can be obtained a resin composition having high transparency. Setting the temperature for melt mixing to 280° C. or less can prevent the acrylic thermoplastic resin (X) form being colored and thermally decomposed.

<Optical Film>

An optical film according to the present invention is a film formed from a resin material including the above-described ionomer resin composition. The optical film is preferably a film obtained by at least uniaxially stretching an unstretched film obtained by film formation. Uniaxially or biaxially stretching an unstretched optical film improves mechanical characteristics such as tensile strength and flexing endurance of the optical film. In the present invention, with the use of the above-described ionomer resin composition, even a stretched optical film can be made small in both of orientational birefringence and photoelastic birefringence and excellent in heat resistance and flexibility.

The optical film may include other components other than the ionomer resin composition. In other words, when the optical film is a film obtained by biaxially stretching an unstretched film made of a resin material including the ionomer resin composition, the resin material may include other components other than the ionomer resin composition.

In the resin material forming the optical film, a content of the ionomer resin composition is preferably 90 parts by mass or more, more preferably 95 parts by mass, and may be 99 parts by mass, based on a total amount of the resin material.

As the other components other than the ionomer resin composition, additives used in an optical film, such as an antioxidant, a lubricant, an ultraviolet ray absorbent, and a stabilizer, can be used as needed. Amounts of addition of these components are not particularly limited as long as the amounts thereof are within a range that allows the advantageous effects of the invention to be effectively exerted. The amounts of addition thereof are preferably 10 parts by mass or less, and more preferably 5 parts by mass or less, based on the total amount of the resin material.

<Physical Properties of Optical Film>

Hereinafter, a detailed description will be given of various characteristics of the optical film according to the present invention.

An absolute value of the in-plane phase difference Re and an absolute value of the thickness direction phase difference Rth of the optical film are both preferably 10.0 nm or less, more preferably 10 nm or less, still more preferably 2.0 nm or less, and even still more preferably 1.0 nm or less. When the absolute value of the in-plane phase difference Re and the absolute value of the thickness direction phase difference Rth are small, the orientational birefringence of the film becomes small, so that the optical film can be more suitably used as an optical film, particularly as a polarizing plate protecting film.

An absolute value of the photoelastic coefficient C of the optical film is preferably $5.0 \times 10^{-12}$ (/Pa) or less, more preferably $4.0 \times 10^{-12}$ (/Pa) or less, and still more preferably $3.0 \times 10^{-12}$ (/Pa) or less. When the absolute value of the photoelastic coefficient C is small, the photoelastic birefringence of the film becomes small, so that the optical film can be more suitably used as an optical film, particularly as a polarizing plate protecting film.

The orientational birefringence of the optical film can be evaluated by measuring retardation (Re) that is an in-plane phase difference value of the film and Rth that is a thickness direction phase difference value thereof by Axoscan manufactured by Axometrics Inc. In addition, the in-plane phase difference Re and the thickness direction phase difference Rth are values measured using light having a wavelength of 590 nm.

When a refractive index of one direction in a film plane is nx, a refractive index of a direction orthogonal thereto is ny, and the thickness of the film is d (nm), Re is represented by the following numerical formula (1):

$$Re = (nx - ny) \times d (nm) \quad (1)$$

When the refractive index of one direction in the film plane is nx, the refractive index of a direction orthogonal thereto is ny, a refractive index of a thickness direction of the film is nz, and the thickness of the film is d (nm), Rth is represented by the following numerical formula (2):

$$Rth = ((nx + ny)/2 - nz) \times d (nm) \quad (2)$$

As for the sign of the phase difference value of the film, when the refractive index is large in an orientation direction of the main chain of the polymer, the value has a positive sign, whereas when the refractive index is large in a direction orthogonal to a stretching direction, the value has a negative sign.

The photoelastic birefringence of the optical film is obtained as a photoelastic coefficient C (/Pa) by measuring an amount of change in the retardation (Re) as the phase difference value of the film due to stress applied to the film using Axoscan manufactured by Axometrics Inc., as with the orientational birefringence properties. A specific method for calculating the photoelastic coefficient C is as the following numerical formula (3):

$$C = \Delta Re / (\Delta \sigma \times t) \quad (3)$$

$\Delta \sigma$ represents an amount of change in stress applied to the film and the unit thereof is [Pa]; t represents a film thickness of the film and the unit thereof is [m], and $\Delta Re$ represents an amount of change in an in-plane phase difference value depending on the amount of change in the stress represented by $\Delta \sigma$ and the unit thereof is [m]. As for the sign of the photoelastic coefficient C, when the refractive index is large in a direction to which stress is applied, the value of C has a positive sign, whereas when the refractive index is large in a direction orthogonal to the direction to which stress is applied, the value thereof has a negative sign.

In the optical film, the number of times of folding thereof in MIT folding endurance test, measured based on JIS P8115 is preferably 50 times or more, more preferably 80 times or more, still more preferably 90 times or more, and may be 110 times or more. Such an optical film can be more suitably used as a polarizing plate protecting film. In addition, since such an optical film is excellent in flexing endurance properties, it can be more suitably used for applications that require large area. Furthermore, when the number of times of folding of the film in MIT folding endurance test is 50 times or more, breakage in a step of conveying and rolling up the optical film after a stretching step and breakage in steps such as bonding the film to a polarizing plate or the like can be prevented.

Additionally, in the present specification, the MIT folding endurance test can be performed using a BE-201 MIT flex index tester manufactured by Tester Sangyo Co., Ltd. In addition, the BE-201 MIT flex index tester manufactured by Tester Sangyo Co., Ltd., is also referred to as a MIT folding endurance tester. Conditions for measurement are an applied weight of 200 g; a flexing point tip R of 0.38; a flexing rate of 175/time; a flexing angle of 135° on right and left; and a sample film width of 15 mm. Then, an average value of the number of times of flexing up to a point in time when breakage is caused by repeatedly flexing the optical film in a conveying direction thereof is regarded as the number of times of folding in MIT folding endurance test.

In the optical film, absolute values of size change rates in the MD direction and the TD direction thereof are each preferably 1.00% or less, more preferably 0.80% or less, and still more preferably 0.50% or less.

Additionally, in the present specification, the size change rates were measured by cutting the optical film into a square with a width of 120 mm and a length of 120 mm and setting two marking points at a distance of 100 mm between them. After measuring a gauge length L0, the optical film was annealed in an atmosphere with 100° C. for 100 hours, and then a gauge length L1 after annealing was measured. Size change rates in the MD direction and the TD direction were obtained according to the following formula (4):

$$\text{Size change rate} = (L0 - L1)/L0 \times 100 \quad (4)$$

The film thickness of the optical film can be 10 μm or more and 150 μm or less, and may be 15 μm or more and 120 μm or less. When the film thickness thereof is 10 μm or more, handling of the film becomes favorable. When the film thickness thereof is 150 μm or less, problems such as increase in haze and increase in material cost per unit area hardly occur.

The optical film according to the present invention may be a film obtained by biaxially stretching an unstretched film made of a resin material including the ionomer resin composition. Herein, a stretch ratio of the biaxial stretching can be adjusted as appropriate so that a desired flexing endurance and the like can be achieved. For example, the stretch ratio can be 1.3 times or more or 1.5 times or more in terms of area ratio. Additionally, the stretch ratio may be 6.0 times or less or 4.0 times or less in terms of area ratio.

<Method for Manufacturing Optical Film>

Next will be a detailed description of an embodiment of a method for manufacturing an optical film.

In the present embodiment, the optical film can be obtained by biaxially stretching an unstretched film made of a resin material including the ionomer resin composition, as described above. The manufacturing method of the present embodiment includes a melt extrusion step that melt extrudes the resin material to obtain an unstretched film and a stretching step of biaxially stretching the unstretched film to obtain an optical film.

The melt extrusion step can be performed, for example, by an extrusion film forming apparatus provided with a die lip. In this case, the resin material is heated/melted in the extrusion film forming apparatus and then continuously discharged from the die lip to be formed into a film.

Extrusion temperature for melt extrusion is preferably 220° C. or more and 300° C. or less, and more preferably 250° C. or more and 280° C. or less. When the extrusion temperature is 220° C. or more, the ionomer resin composition in the resin material is sufficiently melted and kneaded, thus sufficiently preventing an unmolten substance from remaining in the film. Additionally, when the extrusion temperature is 300° C. or less, the occurrence of problems such as coloring of the film due to heat decomposition and adhesion of a decomposed substance to the die lip can be sufficiently prevented.

In the stretching step, an unstretched film (web film) obtained in the melt extrusion step is stretched to obtain an optical film. As a method for stretching, a conventionally known biaxial stretching method can be selected as appropriate. As a biaxial stretching apparatus, for example, a simultaneous biaxial stretching apparatus can be used, in which in a tenter stretching apparatus, the distance between clips holding ends of a film is extended even in the conveying direction of the film. In addition, in the stretching step, a sequential biaxial stretching method can be applied as a combination of stretching between rolls using a circumferential speed difference, stretching by a tenter apparatus, and the like.

The stretching apparatus may be connected to the extrusion film forming apparatus in a continuous line. In addition, the stretching step may be performed by a method of sending off-line a web film rolled up by the extrusion film forming apparatus to the stretching apparatus to stretch the web film.

When a glass transition temperature of the web film is Tg (° C.), the stretching temperature is preferably Tg+2° C. or more and Tg+20° C. or less, and more preferably Tg+5° C. or more and Tg+15° C. or less. When the stretching temperature is Tg+2° C. or more, the occurrence of problems such as breakage of the film during stretching and increase in haze of the film can be sufficiently prevented. In addition, when the stretching temperature is Tg+20° C. or less, the main chain of the polymer is easily oriented, so that the orientation degree of the main chain of the polymer tends to be more favorable.

By stretching a web film formed by the melt film forming method, the main chain of the polymer can be oriented to allow improvement in the flexing endurance properties of the film. On the other hand, when the film is not made of a polymer material having small birefringence, the phase difference value of the film is increased, as a result of which when the film is incorporated in a liquid crystal display apparatus, image quality is deteriorated. In the present embodiment, by using the above-described resin material, there can be obtained an optical film that has both of excellent optical characteristics and excellent flexing endurance properties.

<Polarizing Plate>

A polarizing plate according to the present invention includes the above-described optical film as a protecting film. The optical film is small in both orientational birefringence and photoelastic birefringence. Thus, by applying the polarizing plate including the above-described optical film as a protecting film to a liquid crystal display apparatus, deterioration of image quality due to protecting film can be sufficiently prevented.

In the polarizing plate according to the present invention, other constituent elements other than the optical film are not particularly limited, and the polarizing plate can be of the same structure as known polarizing plates. Specifically, the polarizing plate according to the invention may be one in which at least a part of the protecting film of a known polarizing plate is changed to the optical film. The polarizing plate may have a structure in which the above-described optical film, a polarizing layer, a polarizing layer protecting film, and an adhesive layer are laminated in this order.

<Liquid Crystal Display Apparatus>

A liquid crystal display apparatus according to the present invention includes the above-described polarizing plate. Since the polarizing plate includes the above-described optical film as the protecting film, deterioration of image quality due to optical characteristics of protecting film can be sufficiently prevented. Thus, the liquid crystal display apparatus according to the invention achieves favorable image quality.

In the liquid crystal display apparatus according to the present invention, other constituent elements other than the polarizing plate are not particularly limited, and the display apparatus can be of the same structure as known liquid crystal display apparatuses. Specifically, the liquid crystal display apparatus according to the invention may be one obtained by changing the polarizing plate of a known liquid crystal display apparatus to the above-described polarizing plate.

The liquid crystal display apparatus may be, for example, one that includes a structure in which the above-described polarizing plate, a backlight, a color filter, a liquid crystal layer, a transparent electrode, and a glass substrate are laminated together in this order.

While the present invention has been described in detail hereinabove, the invention is not limited to the above embodiments.

EXAMPLES

Hereinafter, the present invention will be described in more detail by Examples. However, the invention is not limited to the Examples.

<Methods for Synthesizing and Evaluating Acrylic Thermoplastic Resin (X)>

The weight average molecular weight (Mw), number average molecular weight (Mn), glass transition temperature (Tg), and residual volatile content of the acrylic thermoplastic resin (X) were measured as follows.

Mw and Mn represent values in terms of a standard polystyrene molecule amount, measured using HCL-8220 GPC manufactured by Tosoh Corporation. Additionally, columns used were Super-Multipore HZ-M manufactured by Tosoh Corporation, and measurement conditions were: solvent tetrahydrofuran (THF) for HPLC; flow rate 0.35 ml/min; and column temperature 40° C.

Tg was obtained from an on-set temperature of a glass transition point at a time of temperature increase at a temperature increase rate of 10° C./min using a differential scanning calorimeter DSC 7020 manufactured by SIT Nanotechnology Inc. In addition, specimens of the acrylic thermoplastic resin (X) had a mass of 5 mg or more and 10 mg or less.

The residual volatile content was obtained by subtracting a mass of the acrylic thermoplastic resin (X) dried under reduced pressure for 12 hours under conditions of 120° C. and 0.1 mmHg from a mass of the acrylic thermoplastic resin (X) before drying.

Synthesis of Acrylic Thermoplastic Resins

As described below, acrylic thermoplastic resins (a-1) to (a-11) and (b-1) to (b-2) were synthesized, and Mw, Mw/Mn, Tg, and a residual volatile content thereof were measured.

Synthesis of Acrylic Thermoplastic Resin (a-1)

Into a reaction vessel equipped with a stirring device, a thermosensor, a condenser tube, and a nitrogen introducing tube were charged 100 parts by mass of toluene as a reaction solvent, 80.0 parts by mass of methyl methacrylate (hereinafter referred to as "MMA" in some cases), 20.0 parts by mass of N-phenyl maleimide (hereinafter referred to as "PhMI" in some cases), and 1.0 part by mass of acrylic acid (hereinafter referred to as "AA" in some cases) as monomers, 0.1 parts by mass of LUPEROX P, as a polymerization initiator, manufactured by ARKEMA Yoshitomi, Ltd., and 0.06 parts by mass of 1-octanethiol as a chain transfer agent. The mixture was stirred well while passing nitrogen therethrough to homogenize the monomer phase and the reaction solvent. Next, the temperature of the resulting solution was increased up to 110° C., and after confirming reflux of toluene, a separately prepared initiator solution containing 0.4 parts by mass of LUPEROX and 4.6 parts by mass of toluene was added dropwise in 3 hours. After finishing dropping and then keeping the mixed solution for 4 hours, the obtained polymer solution was cooled down to 70° C. Then, the polymer solution was flushed into a flush tank pre-heated to 270° C. under a reduced pressure of 50 kPa, whereby an acrylic thermoplastic resin (a-1) was separated and recovered from the solvent.

The acrylic thermoplastic resin (a-1) had a Mw of $15\times10^4$, a Mw/Mn of 2.5, and a Tg of 133° C. In addition, the residual volatile content thereof was 0.7%.

Synthesis of Acrylic Thermoplastic Resin (a-2)

Synthesis of an acrylic thermoplastic resin was performed in the same manner as the acrylic thermoplastic resin (a-1), except for changing to 80.0 parts by mass of MMA, 20.0 parts by mass of PhMI, and 1.0 part by mass of methacrylic acid (hereinafter referred to as "MAA" in some cases), thereby obtaining an acrylic thermoplastic resin (a-2).

The acrylic thermoplastic resin (a-2) had a Mw of $16\times10^4$, a Mw/Mn of 2.3, and a Tg of 133° C. In addition, the residual volatile content thereof was 0.7%.

Synthesis of Acrylic Thermoplastic Resin (a-3)

Synthesis of an acrylic thermoplastic resin was performed in the same manner as the acrylic thermoplastic resin (a-1), except for changing to 81.0 parts by mass of MMA, 15.0 parts by mass of N-cyclohexyl maleimide (hereinafter referred to as "CHMI" in some cases), 4.0 parts by mass of benzyl methacrylate (hereinafter referred to as "BnMA" in some cases), and 1.0 part by mass of methacrylic acid (hereinafter referred to as "MAA" in some cases), thereby obtaining an acrylic thermoplastic resin (a-3).

The acrylic thermoplastic resin (a-3) had a Mw of $10\times10^4$, a Mw/Mn of 2.6, and a Tg of 126° C. In addition, the residual volatile content thereof was 0.9%.

Synthesis of Acrylic Thermoplastic Resin (a-4)

Synthesis of an acrylic thermoplastic resin was performed in the same manner as the acrylic thermoplastic resin (a-1), except for changing to 81.0 parts by mass of MMA, 13.0 parts by mass of CHMI, 7.0 parts by mass of PhMI, and 1.0 part by mass of MAA, thereby obtaining an acrylic thermoplastic resin (a-4).

The acrylic thermoplastic resin (a-4) had a Mw of $14\times10^4$, a Mw/Mn of 2.4, and a Tg of 131° C. In addition, the residual volatile content thereof was 0.7%.

Synthesis of Acrylic Thermoplastic Resin (a-5)

Synthesis of an acrylic thermoplastic resin was performed in the same manner as the acrylic thermoplastic resin (a-1), except for changing to 70.0 parts by mass of MMA, 30.0 parts by mass of PhMI, and 1.0 part by mass of MAA, thereby obtaining an acrylic thermoplastic resin (a-5).

The acrylic thermoplastic resin (a-5) had a Mw of $18\times10^4$, a Mw/Mn of 2.7, and a Tg of 140° C. In addition, the residual volatile content thereof was 0.7%.

Synthesis of Acrylic Thermoplastic Resin (a-6)

Synthesis of an acrylic thermoplastic resin was performed in the same manner as the acrylic thermoplastic resin (a-1), except for changing to 85.0 parts by mass of MMA, 15.0 parts by mass of PhMI, and 1.0 part by mass of MAA, thereby obtaining an acrylic thermoplastic resin (a-6).

The acrylic thermoplastic resin (a-6) had a Mw of $16\times10^4$, a Mw/Mn of 2.6, and a Tg of 124° C. In addition, the residual volatile content thereof was 0.6%.

Synthesis of Acrylic Thermoplastic Resin (a-7)

Synthesis of an acrylic thermoplastic resin was performed in the same manner as the acrylic thermoplastic resin (a-1), except for changing to 80.0 parts by mass of MMA, 20.0 parts by mass of PhMI, 1.0 part by mass of styrene (hereinafter referred to as "St" in some cases), and 1.0 part by mass of MAA, thereby obtaining an acrylic thermoplastic resin (a-7). The acrylic thermoplastic resin (a-7) had a Mw of 16×10⁴, a Mw/Mn of 2.3, and a Tg of 133° C. In addition, the residual volatile content thereof was 0.6%.

Synthesis of Acrylic Thermoplastic Resin (a-8)

Synthesis of an acrylic thermoplastic resin was performed in the same manner as the acrylic thermoplastic resin (a-1), except for changing to 80.0 parts by mass of MMA, 20.0 parts by mass of PhMI, and 3.0 part by mass of MAA, thereby obtaining an acrylic thermoplastic resin (a-8).

The acrylic thermoplastic resin (a-8) had a Mw of 18×10⁴, a Mw/Mn of 2.5, and a Tg of 134° C. In addition, the residual volatile content thereof was 0.5%.

Synthesis of Acrylic Thermoplastic Resin (a-9)

Synthesis of an acrylic thermoplastic resin was performed in the same manner as the acrylic thermoplastic resin (a-1), except for changing to 70.0 parts by mass of MMA, 20.0 parts by mass of PhMI, 10 part by mass of isobornyl acrylate (hereinafter referred to as "IBA" in some cases), and 1.0 part by mass of MAA, thereby obtaining an acrylic thermoplastic resin (a-9).

The acrylic thermoplastic resin (a-9) had a Mw of 16×10⁴, a Mw/Mn of 2.1, and a Tg of 129° C. In addition, the residual volatile content thereof was 0.6%.

Synthesis of Acrylic Thermoplastic Resin (a-10)

Into a reaction vessel equipped with a stirring device, a thermosensor, a condenser tube, and a nitrogen introducing tube, 300 parts by mass of deionized water and 0.6 parts by mass of polyvinyl alcohol (Kuraray POVAL manufactured by Kuraray Co., Ltd.,) as a dispersant were charged together, and stirring was started. Next, 80 parts by mass of MMA, 20 parts by mass of PhMI, 1.5 parts by mass of tert-butyl methacrylate (hereinafter referred to as "TBMA" in some cases), 1 part by mass of PEROYL TCP as a polymerization initiator, manufactured by NOF Corporation, and 0.22 parts by mass of 1-octanethiol as a chain transfer agent were charged thereinto. Then, the temperature of the resulting mixture was increased up to 70° C. while passing nitrogen therethrough. The state of the mixture after reaching 70° C. was kept as it was for 3 hours, then the mixture was cooled down, followed by filtration, washing, and drying, thereby obtaining an acrylic thermoplastic resin (a-10) in particle form.

The acrylic thermoplastic resin (a-10) had a Mw of 20×10⁴, a Mw/Mn of 2.1, and a Tg of 134° C. In addition, the residual volatile content thereof was 0.3%.

Synthesis of Acrylic Thermoplastic Resin (a-11)

Into a reaction vessel equipped with a stirring device, a thermosensor, a condenser tube, and a nitrogen introducing tube were charged 100 parts by mass of toluene as a reaction solvent, 80.0 parts by mass of MMA, 20.0 parts by mass of PhMI, and 1.5 parts by mass of TBMA as monomers, 0.1 parts by mass of LUPEROX P as a polymerization initiator, manufactured by ARKEMA Yoshitomi, Ltd., and 0.06 parts by mass of 1-octanethiol as a chain transfer agent. The mixture was stirred well while passing nitrogen therethrough to homogenize the monomer phase and the reaction solvent. Next, the temperature of the mixture was increased up to 110° C. After confirming the reflux of toluene, a separately prepared initiator solution containing 0.4 parts by mass of LUPEROX and 4.6 parts by mass of toluene was added dropwise in 3 hours. After finishing dropping and then keeping the mixed solution for 4 hours, the obtained polymer solution was cooled down to 70° C. Then, the polymer solution was flushed into a flush tank pre-heated to 270° C. under a reduced pressure of 50 kPa, whereby an acrylic thermoplastic resin (a-11) was separated and recovered from the solvent.

The acrylic thermoplastic resin (a-11) had a Mw of 20×10⁴, a Mw/Mn of 2.6, and a Tg of 134° C. In addition, the residual volatile content thereof was 0.8%.

Synthesis of Acrylic Thermoplastic Resin (b-1)

Synthesis of an acrylic thermoplastic resin was performed in the same manner as the acrylic thermoplastic resin (a-1), except for changing to 80.0 parts by mass of MMA, 20.0 parts by mass of PhMI, and 10 parts by mass of MAA, thereby obtaining an acrylic thermoplastic resin (b-1).

The acrylic thermoplastic resin (b-1) had a Mw of 16×10⁴, a Mw/Mn of 2.9, and a Tg of 130° C. In addition, the residual volatile content thereof was 0.5%.

Synthesis of Acrylic Thermoplastic Resin (b-2)

Synthesis of an acrylic thermoplastic resin was performed in the same manner as the acrylic thermoplastic resin (a-1), except for changing to 90.0 parts by mass of MMA, 10.0 parts by mass of PhMI, and 1.0 part by mass of MAA, thereby obtaining an acrylic thermoplastic resin (b-2).

The acrylic thermoplastic resin (b-2) had a Mw of 18×10⁴, a Mw/Mn of 2.4, and a Tg of 115° C. In addition, the residual volatile content thereof was 0.4%.

Measurement results of the Mw, molecular amount distribution (Mw/Mn), Tg, and residual volatile content of each acrylic thermoplastic resin obtained in the manner described above are as shown in the following Table 1:

TABLE 1

| | Monomer composition (parts by mass) | | | | | | Characteristics | | | | |
|---|---|---|---|---|---|---|---|---|---|---|---|
| | Alkyl (meth)acrylate unit (a) | N-substituted maleimide unit (b) | | Unsaturated acid and/or unsaturated acid anhydride unit (C) | Structural unit (d) | Other structural unit | Mw (×10⁴) | Mw/Mn | Tg (° C.) | Residual volatile content (wt %) | Polymerization method |
| Table 1 | MMA | CHMI | PhMI | | | | | | | | |
| a-1 | 80 | | 20 | AA 1 | | | 15 | 2.5 | 133 | 0.7 | Solution |
| a-2 | 80 | | 20 | MAA 1 | | | 16 | 2.3 | 133 | 0.7 | Solution |
| a-3 | 81 | 15 | | MAA 1 | BnMA 4 | | 10 | 2.6 | 126 | 0.9 | Solution |
| a-4 | 81 | 13 | 7 | MAA 1 | | | 14 | 2.4 | 131 | 0.7 | Solution |

TABLE 1-continued

| Table 1 | Monomer composition (parts by mass) | | | | | | | Characteristics | | | | |
|---|---|---|---|---|---|---|---|---|---|---|---|---|
| | Alkyl (meth)acrylate unit (a) | N-substituted maleimide unit (b) | | Unsaturated acid and/or unsaturated acid anhydride unit (C) | Structural unit (d) | Other structural unit | | Mw (×10⁴) | Mw/Mn | Tg (° C.) | Residual volatile content (wt %) | Polymerization method |
| | MMA | CHMI | PhMI | | | | | | | | | |
| a-5 | 70 | | 30 | MAA 1 | | | | 18 | 2.7 | 140 | 0.7 | Solution |
| a-6 | 85 | | 15 | MAA 1 | | | | 16 | 2.6 | 124 | 0.6 | Solution |
| a-7 | 80 | | 20 | MAA 1 | | St | 1 | 16 | 2.3 | 133 | 0.6 | Solution |
| a-8 | 80 | | 20 | MAA 3 | | | | 18 | 2.5 | 134 | 0.5 | Solution |
| a-9 | 70 | 20 | | MAA 1 | IBA 10 | | | 16 | 2.1 | 129 | 0.6 | Solution |
| a-10 | 80 | | 20 | TMBA 1.5 | | | | 20 | 2.1 | 134 | 0.3 | Suspension |
| a-11 | 80 | | 20 | TMBA 1.5 | | | | 20 | 2.6 | 134 | 0.8 | Solution |
| b-1 | 80 | | 20 | MAA 10 | | | | 16 | 2.9 | 130 | 0.5 | Solution |
| b-2 | 90 | | 10 | MAA 1 | | | | 18 | 2.4 | 115 | 0.4 | Solution |

<Methods for Manufacturing and Evaluating Optical Film>

Next, using each of the obtained acrylic thermoplastic resins, an optical film was manufactured as follows. The thickness, in-plane phase difference Re, thickness direction phase difference Rth, photoelastic coefficient C, number of times of folding in MIT folding endurance test, and size change rate (MD/TD) of the obtained optical film were measured as follows.

The thickness of the optical film was measured using a digital length measuring system (DIGIMICRO MF501, manufactured by Nikon Corporation).

The in-plane phase difference Re and the thickness direction phase difference Rth were measured using Axoscan manufactured by Axometrics Inc. In addition, the in-plane phase difference Re and the thickness direction phase difference Rth were values measured using light having a wavelength of 590 nm.

The photoelastic coefficient C was obtained by measuring, as a phase difference value of the film, the amount of change in retardation (Re) due to stress applied to the optical film using Axoscan manufactured by Axometrics Inc. Specifically, the photoelastic coefficient C was obtained by the following formula (3):

$$C = \Delta Re/(\Delta \sigma \times t) \tag{3}$$

$\Delta \sigma$ represents an amount of change in stress applied to the film (unit: Pa); t represents a film thickness of the film (unit: m), and $\Delta Re$ represents an amount of change in an in-plane phase difference value depending on the amount of change in the stress represented by $\Delta \sigma$ (unit: m).

Measurement of the number of times of folding in MIT folding endurance test was performed based on ES P8115, using a MIT folding endurance tester BE-201 manufactured by Tester Sangyo Co., Ltd. Measurement conditions were a load of 200 g; a flexing point tip R of 0.38; a flexing rate of 175 times/min; a flexing angle of 135° on right and left; and a sample film width of 15 mm. Then, an average value of the number of times of flexing up to a point in time when breakage is caused by repeatedly flexing the optical film in a conveying direction (MD direction) thereof and the number of times of flexing up to a point in time when breakage is caused by repeatedly flexing the optical film in a width direction (TD direction) thereof was regarded as the number of times of flexing in MIT folding endurance test.

In measuring the size change rate, first, the optical film was cut into a square with a width of 120 mm and a length of 120 mm, and two marking points were set at a distance of 100 mm between them. After measuring a gauge length L0, the optical film was annealed at 100° C. for 100 hours to measure a gauge length L after annealing. Size change rates in the MD direction and the TD direction were obtained according to the following formula (4):

$$\text{Size change rate} = (L0-L1)/L0 \times 100 \tag{4}$$

Manufacturing of Stretched Film

A stretched film was manufactured using each acrylic thermoplastic resin thus obtained, and physical properties of the stretched film were measured.

Example 1

Manufacturing of Stretched Film (A-1)

One hundred parts by mass of a pellet-shaped acrylic thermoplastic resin (a-1) and 0.1 parts by mass of zinc stearate (hereinafter referred to as "Zn-St" in some cases) as a metal compound were dry-blended and melt-mixed in a twin-screw extruder KZW-30 MG manufactured by Technovel Corporation to obtain a film made of an intended ionomer composition. The twin-screw extruder has a screw diameter of 15 mm and a screw effective length (L/D) of 30, and has a hanger-coat type T die disposed via an adapter. Typically, in the case of an amorphous polymer whose glass transition temperature is Tg (° C.), an optimum extrusion temperature Tp (° C.) is obtained by the following numerical formula (5). Thus, the extrusion temperature Tp (° C.) was set to 255° C.

$$Tp = 5(Tg+70)/4 \tag{5}$$

The obtained film web (unstretched film) was stretched by a biaxial stretching machine manufactured by Imoto Machinery Co., Ltd., (stretch temperature: Tg+20° C., stretch ratio: 1.7×1.8 times, sequential biaxial stretching) to obtain a stretched film (A-1).

The thickness of the stretched film (A-1) was 40 μm, in which no turbidity was found by visual inspection and the film had excellent transparency. In addition, the stretched film (A-1) had an in-plane phase difference Re of −0.2 nm, a thickness direction phase difference Rth of −0.1 nm, and a photoelastic coefficient C of 3.0×10⁻¹² (1/Pa). Absolute values of the in-plane phase difference Re and the thickness direction phase difference Rth were both 10.0 nm or less, and an absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 87 times, so that the stretched film had sufficient flexibility. Furthermore, size change rates of the obtained stretched film were −0.34% and −0.39%, respectively, with respect to the MD direction and the TD direction in manufacturing the film. Since absolute values of both of the size change rates were 1.00% or less, the stretched film had sufficient size stability to be used as an optical film.

Example 2

Manufacturing of Stretched Film (A-2)

Manufacturing of a stretched film was performed in the same manner as in Example 1, except that the amount of Zn-St was changed to 0.3 parts by mass, thereby obtaining a stretched film (A-2).

The thickness of the stretched film (A-2) was 40 μm, in which no turbidity was found by visual inspection and the film had excellent transparency. In addition, the stretched film (A-2) had an in-plane phase difference Re of −0.2 nm, a thickness direction phase difference Rth of −0.1 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 99 times, so that the stretched film had sufficient flexibility. Furthermore, the size change rates of the obtained stretched film were −0.30% and −0.35%, respectively, with respect to the MD direction and the TD direction in manufacturing the film. Since absolute values of both of the size change rates were 1.00% or less, the stretched film had sufficient size stability to be used as an optical film.

Example 3

Manufacturing of Stretched Film (A-3)

Manufacturing of a stretched film was performed in the same manner as in Example 1, except that the amount of Zn-St was changed to 0.5 parts by mass, thereby obtaining a stretched film (A-3).

The thickness of the stretched film (A-3) was 40 μm, in which no turbidity was found by visual inspection and the film had excellent transparency. In addition, the stretched film (A-3) had an in-plane phase difference Re of −0.2 nm, a thickness direction phase difference Rth of −0.2 nm, and a photoelastic coefficient C of $3.0 \times 10^{-12}$ (1/Pa). the absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 100 times, so that the stretched film had sufficient flexibility. Furthermore, the size change rates of the obtained stretched film were −0.27% and −0.32%, respectively, with respect to the MD direction and the TD direction in manufacturing the film. Since absolute values of both of the size change rates were 1.00% or less, the stretched film had sufficient size stability to be used as an optical film.

Example 4

Manufacturing of Stretched Film (A-4)

Manufacturing of a stretched film was performed in the same manner as in Example 1, except that the amount of Zn-St was changed to 0.7 parts by mass, thereby obtaining a stretched film (A-4).

The thickness of the stretched film (A-4) was 40 μm, in which no turbidity was found by visual inspection and the film had excellent transparency. In addition, the stretched film (A-4) had an in-plane phase difference Re of −0.2 nm, a thickness direction phase difference Rth of −0.2 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 97 times, so that the stretched film had sufficient flexibility. Furthermore, the size change rates of the obtained stretched film were −0.22% and −0.30%, respectively, with respect to the MD direction and the TD direction in manufacturing the film. Since absolute values of both of the size change rates were 1.00% or less, the stretched film had sufficient size stability to be used as an optical film.

Example 5

Manufacturing of Stretched Film (A-5)

Manufacturing of a stretched film was performed in the same manner as in Example 1, except that the metal compound was changed to 0.5 parts by mass of barium stearate (hereinafter referred to as "Ba-St" in some cases), thereby obtaining a stretched film (A-5).

The thickness of the stretched film (A-5) was 40 μm, in which no turbidity was found by visual inspection and the film had excellent transparency. In addition, the stretched film (A-5) had an in-plane phase difference Re of −0.1 nm, a thickness direction phase difference Rth of −0.1 nm, and a photoelastic coefficient C of $3.2 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 103 times, so that the stretched film had sufficient flexibility. Furthermore, the size change rates of the obtained stretched film were −0.30% and −0.33%, respectively, with respect to the MD direction and the TD direction in manufacturing the film. Since absolute values of both of the size change rates were 1.00% or less, the stretched film had sufficient size stability to be used as an optical film.

Example 6

Manufacturing of Stretched Film (A-6)

Manufacturing of a stretched film was performed in the same manner as in Example 1, except that the acrylic thermoplastic resin was changed to the acrylic thermoplastic resin (a-2), thereby obtaining a stretched film (A-6).

The thickness of the stretched film (A-6) was 40 μm, in which no turbidity was found by visual inspection and the film had excellent transparency. In addition, the stretched film (A-6) had an in-plane phase difference Re of −0.2 nm, a thickness direction phase difference Rth of −0.1 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 116 times, so that the stretched film had sufficient flexibility. Furthermore, the size change rates of the obtained stretched film were −0.30% and −0.37%, respectively, with respect to the MD direction and the TD direction in manufacturing the film. Since absolute values of both of the size change rates were 1.00% or less, the stretched film had sufficient size stability to be used as an optical film.

Example 7

Manufacturing of Stretched Film (A-7)

Manufacturing of a stretched film was performed in the same manner as in Example 6, except that the amount of Zn-St was changed to 0.3 parts by mass, thereby obtaining a stretched film (A-7).

The thickness of the stretched film (A-7) was 40 μm, in which no turbidity was found by visual inspection and the film had excellent transparency. In addition, the stretched film (A-7) had an in-plane phase difference Re of −0.2 nm, a thickness direction phase difference Rth of −0.1 nm, and a photoelastic coefficient C of $3.0 \times 10^{-12}$ (1/Pa). the absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 139 times, so that the stretched film had sufficient flexibility. Furthermore, the size change rates of the obtained stretched film were −0.28% and −0.33%, respectively, with respect to the MD direction and the TD direction in manufacturing the film. Since absolute values of both of the size change rates were 1.00% or less, the stretched film had sufficient size stability to be used as an optical film.

Example 8

Manufacturing of Stretched Film (A-8)

Manufacturing of a stretched film was performed in the same manner as in Example 6, except that the amount of Zn-St was changed to 0.5 parts by mass, thereby obtaining a stretched film (A-8).

The thickness of the stretched film (A-8) was 40 μm, in which no turbidity was found by visual inspection and the film had excellent transparency. In addition, the stretched film (A-8) had an in-plane phase difference Re of −0.2 nm, a thickness direction phase difference Rth of −0.2 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 136 times, so that the stretched film had sufficient flexibility. Furthermore, the size change rates of the obtained stretched film were −0.22% and −0.30%, respectively, with respect to the MD direction and the TD direction in manufacturing the film. Since absolute values of both of the size change rates were 1.00% or less, the stretched film had sufficient size stability to be used as an optical film.

Example 9

Manufacturing of Stretched Film (A-9)

Manufacturing of a stretched film was performed in the same manner as in Example 6, except that the amount of Zn-St was changed to 0.7 parts by mass, thereby obtaining a stretched film (A-9).

The thickness of the stretched film (A-9) was 40 μM, in which no turbidity was found by visual inspection and the film had excellent transparency. In addition, the stretched film (A-9) had an in-plane phase difference Re of −0.2 nm, a thickness direction phase difference Rth of −0.1 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 112 times, so that the stretched film had sufficient flexibility. Furthermore, the size change rates of the obtained stretched film were −0.20% and −0.30%, respectively, with respect to the MD direction and the TD direction in manufacturing the film. Since absolute values of both of the size change rates were 1.00% or less, the stretched film had sufficient size stability to be used as an optical film.

Example 10

Manufacturing of Stretched Film (A-10)

Manufacturing of a stretched film was performed in the same manner as in Example 6, except that the amount of Zn-St was changed to 3.0 parts by mass, thereby obtaining a stretched film (A-10).

The thickness of the stretched film (A-10) was 40 μm, in which no turbidity was found by visual inspection and the film had excellent transparency. In addition, the stretched film (A-10) had an in-plane phase difference Re of −0.8 nm, a thickness direction phase difference Rth of −1.0 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 115 times, so that the stretched film had sufficient flexibility. Furthermore, the size change rates of the obtained stretched film were −0.33% and −0.30%, respectively, with respect to the MD direction and the TD direction in manufacturing the film. Since absolute values of both of the size change rates were 1.00% or less, the stretched film had sufficient size stability to be used as an optical film.

Example 11

Manufacturing of Stretched Film (A-11)

Manufacturing of a stretched film was performed in the same manner as in Example 1, except that the acrylic thermoplastic resin was changed to the acrylic thermoplastic resin (a-3), the amount of Zn-St was changed to 0.5 parts by mass, and the extrusion temperature Tp was changed to 245° C., thereby obtaining a stretched film (A-11).

The thickness of the stretched film (A-11) was 25 in which no turbidity was found by visual inspection and the film had excellent transparency. In addition, the stretched film (A-11) had an in-plane phase difference Re of −0.2 nm, a thickness direction phase difference Rth of −0.1 nm, and a photoelastic coefficient C of $0.1 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 202 times, so that the stretched film had sufficient flexibility. Furthermore, the size change rates of the obtained stretched film were −0.77% and −0.75%, respectively, with respect to the MD direction and the TD direction in manufacturing the film. Since absolute values of both of the size change rates were 1.00% or less, the stretched film had sufficient size stability to be used as an optical film.

Example 12

Manufacturing of Stretched Film (A-12)

Manufacturing of a stretched film was performed in the same manner as in Example 10, except that the amount of Zn-St was changed to 5.0 parts by mass, thereby obtaining a stretched film (A-12).

The thickness of the stretched film (A-12) was 25 in which no turbidity was found by visual inspection and the film had excellent transparency. In addition, the stretched film (A-12) had an in-plane phase difference Re of −0.8 nm, a thickness direction phase difference Rth of −1.0 nm, and a photoelastic coefficient C of $0.2 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 168 times, so that the stretched film had sufficient flexibility. Furthermore, the size change rates of the obtained stretched film were −0.95% and −0.98%, respectively, with respect to the MD direction and the TD direction in manufacturing the film. Since absolute values of both of the size change rates were 1.00% or less, the stretched film had sufficient size stability to be used as an optical film.

Example 13

Manufacturing of Stretched Film (A-13)

Manufacturing of a stretched film was performed in the same manner as in Example 1, except that the acrylic thermoplastic resin was changed to the acrylic thermoplastic resin (a-4), the amount of zinc stearate (Zn-St) was changed to 0.5 parts by mass, and the extrusion temperature Tp was changed to 250° C., thereby obtaining a stretched film (A-13).

The thickness of the stretched film (A-13) was 25 μm, in which no turbidity was found by visual inspection and the film had excellent transparency. In addition, the stretched film (A-13) had an in-plane phase difference Re of −0.1 nm, a thickness direction phase difference Rth of −0.2 nm, and a photoelastic coefficient C of $0.1 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 160 times, so that the stretched film had sufficient flexibility. Furthermore, the size change rates of the obtained stretched film were −0.52% and −0.42%, respectively, with respect to the MD direction and the TD direction in manufacturing the film. Since absolute values of both of the size change rates were 1.00% or less, the stretched film had sufficient size stability to be used as an optical film.

Example 14

Manufacturing of Stretched Film (A-14)

Manufacturing of a stretched film was performed in the same manner as in Example 1, except that the acrylic thermoplastic resin was changed to the acrylic thermoplastic resin (a-5) and the amount of Zn-St was changed to 0.5 parts by mass, thereby obtaining a stretched film (A-14).

The thickness of the stretched film (A-14) was 40 μm, in which no turbidity was found by visual inspection and the film had excellent transparency. In addition, the stretched film (A-14) had an in-plane phase difference Re of 6.0 nm, a thickness direction phase difference Rth of 6.0 nm, and a photoelastic coefficient C of $5.0 \times 10^{-12}$ (1/Pa). the absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 75 times, so that the stretched film had sufficient flexibility. Furthermore, the size change rates of the obtained stretched film were −0.25% and −0.30%, respectively, with respect to the MD direction and the TD direction in manufacturing the film. Since absolute values of both of the size change rates were 1.00% or less, the stretched film had sufficient size stability to be used as an optical film.

Example 15

Manufacturing of Stretched Film (A-15)

Manufacturing of a stretched film was performed in the same manner as in Example 1, except that the acrylic thermoplastic resin was changed to the acrylic thermoplastic resin (a-6) and the amount of Zn-St was changed to 0.5 parts by mass, thereby obtaining a stretched film (A-15).

The thickness of the stretched film (A-15) was 40 μm, in which no turbidity was found by visual inspection and the film had excellent transparency. In addition, the stretched film (A-15) had an in-plane phase difference Re of −3.0 nm, a thickness direction phase difference Rth of −3.0 nm, and a photoelastic coefficient C of −0.6×10$^{-12}$ (1/Pa). The absolute values of the in-plane phase difference Re and the thickness direction phase difference Rth were both 10.0 nm or less and the absolute value of the photoelastic coefficient C was 5.0×10$^{-12}$ (1/Pa) or less, so that the obtained stretched film was suitable as a polarizing plate protecting film of a liquid crystal display apparatus. In addition, the number of times of folding of the stretched film in MIT folding endurance test was 145 times, so that the stretched film had sufficient flexibility. Furthermore, the size change rates of the obtained stretched film were −0.25% and −0.35%, respectively, with respect to the MD direction and the TD direction in manufacturing the film. Since absolute values of both of the size change rates were 1.00% or less, the stretched film had sufficient size stability to be used as an optical film.

Example 16

Manufacturing of Stretched Film (A-16)

Manufacturing of a stretched film was performed in the same manner as in Example 1, except that the acrylic thermoplastic resin was changed to the acrylic thermoplastic resin (a-7) and the amount of Zn-St was changed to 0.5 parts by mass, thereby obtaining a stretched film (A-16).

The thickness of the stretched film (A-16) was 40 μm, in which no turbidity was found by visual inspection and the film had excellent transparency. In addition, the stretched film (A-16) had an in-plane phase difference Re of −0.2 nm, a thickness direction phase difference Rth of −0.3 nm, and a photoelastic coefficient C of 3.0×10$^{-12}$ (1/Pa). The absolute values of the in-plane phase difference Re and the thickness direction phase difference Rth were both 10.0 nm or less and the absolute value of the photoelastic coefficient C was 5.0×10$^{-12}$ (1/Pa) or less, so that the obtained stretched film was suitable as a polarizing plate protecting film of a liquid crystal display apparatus. In addition, the number of times of folding of the stretched film in MIT folding endurance test was 125 times, so that the stretched film had sufficient flexibility. Furthermore, the size change rates of the obtained stretched film were −0.30% and −0.33%, respectively, with respect to the MD direction and the TD direction in manufacturing the film. Since absolute values of both of the size change rates were 1.00% or less, the stretched film had sufficient size stability to be used as an optical film.

Example 17

Manufacturing of Stretched Film (A-17)

Manufacturing of a stretched film was performed in the same manner as in Example 1, except that the acrylic thermoplastic resin was changed to the acrylic thermoplastic resin (a-8) and the amount of Zn-St was changed to 0.5 parts by mass, thereby obtaining a stretched film (A-17).

The thickness of the stretched film (A-17) was 40 μm, in which no turbidity was found by visual inspection and the film had excellent transparency. In addition, the stretched film (A-17) had an in-plane phase difference Re of −0.3 nm, a thickness direction phase difference Rth of −0.3 nm, and a photoelastic coefficient C of 3.0×10$^{-12}$ (1/Pa). The absolute values of the in-plane phase difference Re and the thickness direction phase difference Rth were both 10.0 nm or less and the absolute value of the photoelastic coefficient C was 5.0×10$^{-12}$ (1/Pa) or less, so that the obtained stretched film was suitable as a polarizing plate protecting film of a liquid crystal display apparatus. In addition, the number of times of folding of the stretched film in MIT folding endurance test was 120 times, so that the stretched film had sufficient flexibility. Furthermore, the size change rates of the obtained stretched film were −0.20% and −0.30%, respectively, with respect to the MD direction and the TD direction in manufacturing the film. Since absolute values of both of the size change rates were 1.00% or less, the stretched film had sufficient size stability to be used as an optical film.

Example 18

Manufacturing of Stretched Film (A-18)

Manufacturing of a stretched film was performed in the same manner as in Example 1, except that the acrylic thermoplastic resin was changed to the acrylic thermoplastic resin (a-9) and the amount of Zn-St was changed to 0.5 parts by mass, thereby obtaining a stretched film (A-18).

The thickness of the stretched film (A-18) was 40 μm, in which no turbidity was found by visual inspection and the film had excellent transparency. In addition, the stretched film (A-18) had an in-plane phase difference Re of 0.8 nm, a thickness direction phase difference Rth of 0.8 nm, and a photoelastic coefficient C of −0.6×10$^{-12}$ (1/Pa). The absolute values of the in-plane phase difference Re and the thickness direction phase difference Rth were both 10.0 nm or less and the absolute value of the photoelastic coefficient C was 5.0×10$^{-12}$ (1/Pa) or less, so that the obtained stretched film was suitable as a polarizing plate protecting film of a liquid crystal display apparatus. In addition, the number of times of folding of the stretched film in MIT folding endurance test was 68 times, so that the stretched film had sufficient flexibility. Furthermore, the size change rates of the obtained stretched film were −0.22% and −0.32%, respectively, with respect to the MD direction and the TD direction in manufacturing the film. Since absolute values of both of the size change rates were 1.00% or less, the stretched film had sufficient size stability to be used as an optical film.

Example 19

Manufacturing of Stretched Film (A-19)

Manufacturing of a stretched film was performed in the same manner as in Example 1, except that the acrylic thermoplastic resin was changed to the acrylic thermoplastic resin (a-10) and the amount of Zn-St was changed to 0.5 parts by mass, thereby obtaining a stretched film (A-19).

The thickness of the stretched film (A-19) was 40 μm, in which no turbidity was found by visual inspection and the film had excellent transparency. In addition, the stretched film (A-19) had an in-plane phase difference Re of 0.4 nm, a thickness direction phase difference Rth of 0.3 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 230 times, so that the stretched film had sufficient flexibility. Furthermore, the size change rates of the obtained stretched film were −0.30% and −0.40%, respectively, with respect to the MD direction and the TD direction in manufacturing the film. Since absolute values of both of the size change rates were 1.00% or less, the stretched film had sufficient size stability to be used as an optical film.

Example 20

Manufacturing of Stretched Film (A-20)

Manufacturing of a stretched film was performed in the same manner as in Example 1, except that the acrylic thermoplastic resin was changed to the acrylic thermoplastic resin (a-11), thereby obtaining a stretched film (A-20).

The thickness of the stretched film (A-20) was 40 μm, in which no turbidity was found by visual inspection and the film had excellent transparency. In addition, the stretched film (A-20) had an in-plane phase difference Re of 0.4 nm, a thickness direction phase difference Rth of 0.3 nm, and a photoelastic coefficient C of $3.0 \times 10^{-12}$ (1/Pa). The absolute values of the in-plane phase difference Re and the thickness direction phase difference Rth were both 10.0 nm or less and the absolute value of the photoelastic coefficient C was $5.0 \times 10^{-12}$ (1/Pa) or less, so that the obtained stretched film was suitable as a polarizing plate protecting film of a liquid crystal display apparatus. In addition, the number of times of folding of the stretched film in MIT folding endurance test was 214 times, so that the stretched film had sufficient flexibility. Furthermore, the size change rates of the obtained stretched film were −0.30% and −0.33%, respectively, with respect to the MD direction and the TD direction in manufacturing the film. Since absolute values of both of the size change rates were 1.00% or less, the stretched film had sufficient size stability to be used as an optical film.

Comparative Example 1

Manufacturing of Stretched Film (B-1)

Manufacturing of a stretched film was performed in the same manner as in Example 1, except that no metal compound was added, thereby obtaining a stretched film (B-1).

The thickness of the stretched film (B-1) was 40 μm. In addition, the stretched film (B-1) had an in-plane phase difference Re of −0.2 nm, a thickness direction phase difference Rth of −0.1 nm, and a photoelastic coefficient C of $3.0 \times 10^{-12}$ (1/Pa). In addition, the number of times of folding of the stretched film in MIT folding endurance test was 63 times. Furthermore, the size change rates of the obtained stretched film were −0.34% and −0.39%, respectively, with respect to the MD direction and the TD direction in manufacturing the film. When compared with the stretched films obtained in Examples 1 to 5, the number of times of folding of the stretched film (B-1) in MIT folding endurance test was less than those of folding of the stretched films, showing that the stretched film (B-1) had less flexing endurance.

Comparative Example 2

Manufacturing of Stretched Film (B-2)

Manufacturing of a stretched film was performed in the same manner as in Example 6, except that no metal compound was added, thereby obtaining a stretched film (B-2).

The thickness of the stretched film (B-2) was 40 μm. In addition, the stretched film (B-2) had an in-plane phase difference Re of −0.2 nm, a thickness direction phase difference Rth of −0.1 nm, and a photoelastic coefficient C of $3.0 \times 10^{-12}$ (1/Pa). In addition, the number of times of folding of the stretched film in MIT folding endurance test was 87 times. Furthermore, the size change rates of the obtained stretched film were −0.32% and −0.39%, respectively, with respect to the MD direction and the TD direction in manufacturing the film. When compared with the stretched films obtained in Examples 6 to 11, the number of times of folding of the film (B-2) in MIT folding endurance test was less than those of folding of the stretched films, showing that the stretched film (B-2) had less flexing endurance.

Comparative Example 3

Manufacturing of Stretched Film (B-3)

Manufacturing of a stretched film was performed in the same manner as in Example 12, except that no metal compound was added, thereby obtaining a stretched film (B-3).

The thickness of the stretched film (B-3) was 25 μm. In addition, the stretched film (B-3) had an in-plane phase difference Re of −0.2 nm, a thickness direction phase difference Rth of −0.2 nm, and a photoelastic coefficient C of $0.3 \times 10^{-12}$ (1/Pa). In addition, the number of times of folding of the stretched film in MIT folding endurance test was 150 times. Furthermore, the size change rates of the obtained stretched film were −0.99% and −1.00%, respectively, with respect to the MD direction and the TD direction in manufacturing the film. When compared with the stretched films obtained in Examples 12 and 13, the number of times of folding of the stretched film (B-3) in MIT folding endurance test was less than those of folding of the stretched films, showing that the stretched film (B-3) had less flexing endurance.

Comparative Example 4

Manufacturing of Stretched Film (B-4)

Manufacturing of a stretched film was performed in the same manner as in Example 14, except that no metal compound was added, thereby obtaining a stretched film (B-4).

The thickness of the stretched film (B-4) was 25 μm. In addition, the stretched film (B-4) had an in-plane phase difference Re of −0.1 nm, a thickness direction phase difference Rth of −0.2 nm, and a photoelastic coefficient C of $0.1 \times 10^{-12}$ (1/Pa). In addition, the number of times of folding of the stretched film in MIT folding endurance test was 132 times. Furthermore, the size change rates of the obtained stretched film were −0.68% and −0.55%, respectively, with respect to the MD direction and the TD direction in manufacturing the film. When compared with the stretched film obtained in Example 14, the number of times of folding of the stretched film (B-4) in MIT folding endurance test was less than that of folding of the stretched film, showing that the stretched film (B-4) had less flexing endurance.

Comparative Example 5

Manufacturing of Stretched Film (B-5)

Manufacturing of a stretched film was performed in the same manner as in Example 15, except that no metal compound was added, thereby obtaining a stretched film (B-5).

The thickness of the stretched film (B-5) was 40 μm. In addition, the stretched film (B-5) had an in-plane phase difference Re of 6.0 nm, a thickness direction phase difference Rth of 6.0 nm, and a photoelastic coefficient C of $5.0 \times 10^{-12}$ (1/Pa). In addition, the number of times of folding of the stretched film in MIT folding endurance test was 56 times. Furthermore, the size change rates of the obtained stretched film were −0.35% and −0.33%, respectively, with respect to the MD direction and the TD direction in manufacturing the film. When compared with the stretched film obtained in Example 15, the number of times of folding of the stretched film (B-5) in MIT folding endurance test was less than that of folding of the stretched film, showing that the stretched film (B-5) had less flexing endurance.

Comparative Example 6

Manufacturing of Stretched Film (B-6)

Manufacturing of a stretched film was performed in the same manner as in Example 16, except that no metal compound was added, thereby obtaining a stretched film (B-6).

The thickness of the stretched film (B-6) was 40 μm. In addition, the stretched film (B-5) had an in-plane phase difference Re of −3.0 nm, a thickness direction phase difference Rth of −3.0 nm, and a photoelastic coefficient C of $-0.6 \times 10^{-12}$ (1/Pa). In addition, the number of times of folding of the stretched film in MIT folding endurance test was 85 times. Furthermore, the size change rates of the obtained stretched film were −0.29% and −0.40%, respectively, with respect to the MD direction and the TD direction in manufacturing the film. When compared with the stretched film obtained in Example 16, the number of times of folding of the stretched film (B-6) in MIT folding endurance test was less than that of folding of the stretched film, showing that the stretched film (B-6) had less flexing endurance.

Comparative Example 7

Manufacturing of Stretched Film (B-7)

Manufacturing of a stretched film was performed in the same manner as in Example 17, except that no metal compound was added, thereby obtaining a stretched film (B-7).

The thickness of the stretched film (B-7) was 40 μm. In addition, the stretched film (B-7) had an in-plane phase difference Re of −0.3 nm, a thickness direction phase difference Rth of −0.1 nm, and a photoelastic coefficient C of $3.0 \times 10^{-12}$ (1/Pa). In addition, the number of times of folding of the stretched film in MIT folding endurance test was 73 times. Furthermore, the size change rates of the obtained stretched film were −0.35% and −0.38%, respectively, with respect to the MD direction and the TD direction in manufacturing the film. When compared with the stretched film obtained in Example 17, the number of times of folding of the stretched film (B-7) in MIT folding endurance test was less than that of folding of the stretched film, showing that the stretched film (B-7) had less flexing endurance.

Comparative Example 8

Manufacturing of Stretched Film (B-8)

Manufacturing of a stretched film was performed in the same manner as in Example 18, except that no metal compound was added, thereby obtaining a stretched film (B-8).

The thickness of the stretched film (B-8) was 40 μm. In addition, the stretched film (B-8) had an in-plane phase difference Re of −0.3 nm, a thickness direction phase difference Rth of −0.3 nm, and a photoelastic coefficient C of $3.0 \times 10^{-12}$ (1/Pa). In addition, the number of times of folding of the stretched film in MIT folding endurance test was 85 times. Furthermore, the size change rates of the obtained stretched film were −0.25% and −0.30%, respectively, with respect to the MD direction and the TD direction in manufacturing the film. When compared with the stretched film obtained in Example 18, the number of times of folding of the stretched the film (B-8) MIT folding endurance was less than that of folding of the stretched film, showing that the stretched film (B-8) had less flexing endurance.

Comparative Example 9

Manufacturing of Stretched Film (B-9)

Manufacturing of a stretched film was performed in the same manner as in Example 19, except that no metal compound was added, thereby obtaining a stretched film (B-9).

The thickness of the stretched film (B-9) was 40 μm. In addition, the stretched film (B-9) had an in-plane phase difference Re of 0.8 nm, a thickness direction phase difference Rth of 0.8 nm, and a photoelastic coefficient C of $-0.6 \times 10^{-12}$ (1/Pa). In addition, the number of times of folding of the stretched film in MIT folding endurance test was 42 times. Furthermore, the size change rates of the obtained stretched film were −0.30% and −0.40%, respectively, with respect to the MD direction and the TD direction in manufacturing the film.

Comparative Example 10

Manufacturing of Stretched Film (B-10)

Manufacturing of a stretched film was performed in the same manner as in Example 20, except that no metal compound was added, thereby obtaining a stretched film (B-10).

[0247] The thickness of the stretched film (B-10) was 40 μm. In addition, the stretched film (B-10) had an in-plane phase difference Re of 0.4 nm, a thickness direction phase difference Rth of 0.3 nm, and a photoelastic coefficient C of $3.0 \times 10^{-12}$ (1/Pa). In addition, the number of times of folding of the stretched film in MIT folding endurance test was 160 times. Furthermore, the size change rates of the obtained stretched film were −0.30% and −0.40%, respectively, with respect to the MD direction and the TD direction in manufacturing the film. When compared to the stretched film obtained in Example 20, the number of times of folding of the stretched film (B-10) in MIT folding endurance test was less than that of folding of the stretched film, showing that the stretched film (B-10) had less flexing endurance.

Comparative Example 11

Manufacturing of Stretched Film (B-11)

Manufacturing of a stretched film was performed in the same manner as in Example 21, except that no metal compound was added, thereby obtaining a stretched film (B-11).

The thickness of the stretched film (B-11) was 40 μm. In addition, the stretched film (B-11) had an in-plane phase difference Re of 0.4 nm, a thickness direction phase difference Rth of 0.3 nm, and a photoelastic coefficient C of $3.0 \times 10^{-12}$ (1/Pa). In addition, the number of times of folding of the stretched film in MIT folding endurance test was 153 times. Furthermore, the size change rates of the obtained stretched film were −0.35% and −0.40%, respectively, with respect to the MD direction and the TD direction in manufacturing the film. When compared to the stretched film obtained in Example 21, the number of times of folding of the stretched film (B-11) in MIT folding endurance test was less than that of folding of the stretched film, showing that the stretched film (B-11) had less flexing endurance.

Comparative Example 12

Manufacturing of Stretched Film (B-12)

Manufacturing of a stretched film was performed in the same manner as in Example 1, except that the acrylic thermoplastic resin was changed to the acrylic thermoplastic resin (b-1) and the amount of Zn-St was changed to 0.5 parts by mass, thereby obtaining a stretched film (B-12).

The thickness of the stretched film (B-12) was 40 μm. In addition, the stretched film (B-12) had an in-plane phase difference Re of −1.0 nm, a thickness direction phase difference Rth of −1.0 nm, and a photoelastic coefficient C of $2.0 \times 10^{-12}$ (1/Pa). In addition, the number of times of folding of the stretched film in MIT folding endurance test was 120 times. Furthermore, the size change rates of the obtained stretched film were −0.22% and −0.30%, respectively, with respect to the MD direction and the TD direction in manufacturing the film. The obtained stretched film was found to have a foreign substance in gel form on a film surface and thus the state of the film surface was not favorable.

Comparative Example 13

Manufacturing of Stretched Film (B-13)

Manufacturing of a stretched film was performed in the same manner as in Example 1, except that the acrylic thermoplastic resin was changed to the acrylic thermoplastic resin (b-2) and the amount of Zn-St was changed to 0.5 parts by mass, thereby obtaining a stretched film (B-13).

The thickness of the stretched film (B-13) was 40 μm. In addition, the stretched film (B-13) had an in-plane phase difference Re of −6.0 nm, a thickness direction phase difference Rth of −6.0 nm, and a photoelastic coefficient C of $-1.0 \times 10^{-12}$ (1/Pa). In addition, the number of times of folding of the stretched film in MIT folding endurance test was 133 times. Furthermore, the size change rates of the obtained stretched film were −1.40% and −1.20%, respectively, with respect to the MD direction and the TD direction in manufacturing the film.

The following Table 2 shows measurement results of the thickness, in-plane phase difference Re, thickness direction phase difference Rth, and photoelastic coefficient C, the number of times of folding in MIT folding endurance test, and size change rates of each of the stretched films of Examples and Comparative Examples obtained as described above.

TABLE 2

| Table 2 | Stretched film | Acrylic thermoplastic resin (X) | Metal compound (Y) | | Biaxially stretched film | | | | | | |
|---|---|---|---|---|---|---|---|---|---|---|---|
| | | | | | Number of times of folding in MIT folding endurance test (times) | Thickness (μm) | In-plane phase difference Re (nm) | Thickness direction phase difference Rth (nm) | Photoelastic coefficient C ($\times 10^{-12}$/Pa) | Size change rate (%) | |
| | | | | | | | | | | MD direction | TD direction |
| Ex. 1 | A-1 | a-1 | Zn-St | 0.1 | 87 | 40 | −0.2 | −0.1 | 3.0 | −0.34 | −0.39 |
| Ex. 2 | A-2 | a-1 | Zn-St | 0.3 | 99 | 40 | −0.2 | −0.1 | 3.0 | −0.30 | −0.35 |
| Ex. 3 | A-3 | a-1 | Zn-St | 0.5 | 100 | 40 | −0.2 | −0.2 | 3.0 | −0.27 | −0.32 |
| Ex. 4 | A-4 | a-1 | Zn-St | 0.7 | 97 | 40 | −0.2 | −0.2 | 3.0 | −0.22 | −0.30 |
| Ex. 5 | A-5 | a-1 | Ba-St | 0.5 | 103 | 40 | −0.1 | −0.1 | 3.2 | −0.30 | −0.33 |
| Ex. 6 | A-6 | a-2 | Zn-St | 0.1 | 116 | 40 | −0.2 | −0.1 | 3.0 | −0.30 | −0.37 |
| Ex. 7 | A-7 | a-2 | Zn-St | 0.3 | 139 | 40 | −0.2 | −0.1 | 3.0 | −0.28 | −0.33 |
| Ex. 8 | A-8 | a-2 | Zn-St | 0.5 | 136 | 40 | −0.2 | −0.2 | 3.0 | −0.22 | −0.30 |
| Ex. 9 | A-9 | a-2 | Zn-St | 0.7 | 112 | 40 | −0.2 | −0.1 | 3.0 | −0.20 | −0.30 |
| Ex. 10 | A-10 | a-2 | Zn-St | 3.0 | 115 | 40 | −0.8 | −1.0 | 3.0 | −0.33 | −0.30 |
| Ex. 11 | A-11 | a-3 | Zn-St | 0.5 | 202 | 25 | −0.2 | −0.1 | 0.1 | −0.77 | −0.75 |
| Ex. 12 | A-12 | a-3 | Zn-St | 5.0 | 168 | 25 | −0.8 | −1.0 | 0.2 | −0.95 | −0.98 |
| Ex. 13 | A-13 | a-4 | Zn-St | 0.5 | 160 | 25 | −0.1 | −0.2 | 0.1 | −0.52 | −0.42 |
| Ex. 14 | A-14 | a-5 | Zn-St | 0.5 | 75 | 40 | 6.0 | 6.0 | 5.0 | −0.25 | −0.30 |

TABLE 2-continued

| Table 2 | Stretched film | Acrylic thermoplastic resin (X) | Metal compound (Y) | | Biaxially stretched film | | | | | | |
|---|---|---|---|---|---|---|---|---|---|---|---|
| | | | | | Number of times of folding in MIT folding endurance test (times) | Thickness (μm) | In-plane phase difference Re (nm) | Thickness direction phase difference Rth (nm) | Photoelastic coefficient C (×10$^{-12}$/Pa) | Size change rate (%) | |
| | | | | | | | | | | MD direction | TD direction |
| Ex. 15 | A-15 | a-6 | Zn-St | 0.5 | 145 | 40 | −3.0 | −3.0 | −0.6 | −0.25 | −0.35 |
| Ex. 16 | A-16 | a-7 | Zn-St | 0.5 | 125 | 40 | −0.2 | −0.3 | 3.0 | −0.30 | −0.33 |
| Ex. 17 | A-17 | a-8 | Zn-St | 0.5 | 120 | 40 | −0.3 | −0.3 | 3.0 | −0.20 | −0.30 |
| Ex. 18 | A-18 | a-9 | Zn-St | 0.5 | 68 | 40 | 0.8 | 0.8 | −0.6 | −0.22 | −0.32 |
| Ex. 19 | A-19 | a-10 | Zn-St | 0.5 | 230 | 40 | 0.4 | 0.3 | 3.0 | −0.30 | −0.40 |
| Ex. 20 | A-20 | a-11 | Zn-St | 0.5 | 214 | 40 | 0.4 | 0.3 | 3.0 | −0.30 | −0.33 |
| Comp-Ex. 1 | B-1 | a-1 | — | — | 63 | 40 | −0.2 | −0.1 | 3.0 | −0.34 | −0.39 |
| Comp-Ex. 2 | B-2 | a-2 | — | — | 87 | 40 | −0.2 | −0.1 | 3.0 | −0.32 | −0.39 |
| Comp-Ex. 3 | B-3 | a-3 | — | — | 150 | 25 | −0.2 | −0.2 | 0.3 | −0.99 | −1.00 |
| Comp-Ex. 4 | B-4 | a-4 | — | — | 132 | 25 | −0.1 | −0.2 | 0.1 | −0.68 | −0.55 |
| Comp-Ex. 5 | B-5 | a-5 | — | — | 56 | 40 | 6.0 | 6.0 | 5.0 | −0.35 | 0.33 |
| Comp-Ex. 6 | B-6 | a-6 | — | — | 85 | 40 | −3.0 | −3.0 | −0.6 | −0.29 | −0.40 |
| Comp-Ex. 7 | B-7 | a-7 | — | — | 73 | 40 | −0.3 | −0.1 | 3.0 | −0.35 | −0.38 |
| Comp-Ex. 8 | B-8 | a-8 | — | — | 85 | 40 | −0.3 | −0.3 | 3.0 | −0.25 | −0.30 |
| Comp-Ex. 9 | B-9 | a-9 | — | — | 42 | 40 | 0.8 | 0.8 | −0.6 | −0.30 | −0.40 |
| Comp-Ex. 10 | B-10 | a-10 | — | — | 160 | 40 | 0.4 | 0.3 | 3.0 | −0.30 | −0.40 |
| Comp-Ex. 11 | B-11 | a-11 | — | — | 153 | 40 | 0.4 | 0.3 | 3.0 | −0.35 | −0.40 |
| Comp-Ex. 12 | B-12 | b-1 | Zn-St | 0.5 | 120 | 40 | −1.0 | −1.0 | 2.0 | −0.22 | −0.30 |
| Comp-Ex. 13 | B-13 | b-2 | Zn-St | 0.5 | 133 | 40 | −6.0 | −6.0 | −1.0 | −1.40 | −1.20 |

The invention claimed is:

1. An ionomer resin composition obtained by reacting an acrylic thermoplastic resin (X) comprising a chain alkyl (meth)acrylate unit (a), an N-substituted maleimide unit (b), and an unsaturated acid and/or unsaturated acid anhydride unit (c) with a metal compound (Y),
   wherein the acrylic thermoplastic resin (X) comprises the chain alkyl (meth)acrylate unit (a), the N-substituted maleimide unit (b), and the unsaturated acid and/or unsaturated acid anhydride unit (c) in a total amount of 80% by mass or more; and
   wherein the content of the structural unit (a) with respect to 100 parts by mass in total of the acrylic thermoplastic resin (X) is from 65 to 87 parts by mass,
   the content of the structural unit (b) with respect to 100 parts by mass in total of the acrylic thermoplastic resin (X) is from 1 to 30 parts by mass, and
   the content of the structural unit (c) with respect to 100 parts by mass in total of the acrylic thermoplastic resin (X) is from 0.1 to 5 parts by mass.

2. The ionomer resin composition according to claim 1, wherein a chain alkyl group in the chain alkyl (meth)acrylate unit (a) has from 1 to 6 carbon atoms.

3. The ionomer resin composition according to claim 1, wherein the N-substituted maleimide unit (b) includes an N-aromatic group-substituted maleimide unit and/or N-alkyl group-substituted maleimide unit.

4. The ionomer resin composition according to claim 1, wherein the N-substituted maleimide unit (b) includes an N-phenyl maleimide unit and/or N-cyclohexyl maleimide unit.

5. The ionomer resin composition according to claim 1, wherein the unsaturated acid and/or unsaturated acid anhydride unit (c) is selected from the group consisting of a (meth)acrylate unit and a maleic anhydride unit.

6. The ionomer resin composition according to claim 1, wherein the acrylic thermoplastic resin (X) further comprises a structural unit (d) obtained from a monomer represented by the following formula (1):

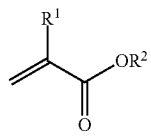

(1)

wherein, in the formula (1), $R^1$ represents a hydrogen atom or a methyl group, and $R^2$ represents a group having a cyclic structure.

7. The ionomer resin composition according to claim 6, wherein $R^2$ in the formula (1) is a group having an alicyclic structure or a group having an aromatic ring.

8. The ionomer resin composition according to claim 1, wherein the ionomer resin composition is obtained by reacting 100 parts by mass of the acrylic thermoplastic resin (X) with from 0.01 to 10 parts by mass of the metal compound (Y).

9. The ionomer resin composition according to claim 1, wherein the metal compound (Y) is at least one selected from the group consisting of an organic acid metal salt, a metal carbonate, and an inorganic acid metal salt.

10. The ionomer resin composition according to claim 1, wherein the metal compound (Y) is a metal stearate.

11. An optical film comprising the ionomer resin composition according to claim 1.

12. The optical film according to claim 11, wherein the optical film is a stretched film obtained by stretching an unstretched film made of a resin material comprising the ionomer resin composition in at least a uniaxial direction.

13. The optical film according to claim 11, wherein an absolute value of an in-plane phase difference Re with respect to light having a wavelength of from 400 to 800 nm is 10.0 nm or less, and an absolute value of a thickness direction phase difference Rth with respect to the light having the wavelength of from 400 to 800 nm is 10.0 nm or less.

14. The optical film according to claim 11, wherein an absolute value of a photoelastic coefficient C is $5.0 \times 10^{-2}$ (/Pa) or less.

15. The optical film according to claim 11, wherein a number of times of folding in MIT folding endurance test, measured based on JIS P8115, is 50 times or more.

16. The optical film according to claim 11, wherein absolute values of size change rates in an MD direction and a TD direction after allowing the optical film to stand in an atmosphere with 100° C. for 100 hours are 1.00% or less.

17. A polarizing plate comprising the optical film according to claim 11.

18. A liquid crystal display apparatus comprising the polarizing plate according to claim 17.

* * * * *